(12) United States Patent
Thompson et al.

(10) Patent No.: US 11,414,166 B2
(45) Date of Patent: Aug. 16, 2022

(54) MARINE VESSEL WITH HULL-INTEGRATED ELECTRICAL ENERGY STORAGE FOR VESSEL PROPULSION

(71) Applicant: Ockerman Automation Consulting, Inc., Anacortes, WA (US)

(72) Inventors: Richard Thompson, Fredericksburg, TX (US); Jennifer Michaeli, Smithfield, VA (US); John Ockerman, Carrollton, VA (US)

(73) Assignee: Ockerman Automation Consulting, Inc., Anacortes, WA (US)

( * ) Notice: Subject to any disclaimer, the term of this patent is extended or adjusted under 35 U.S.C. 154(b) by 116 days.

(21) Appl. No.: 16/883,792

(22) Filed: May 26, 2020

(65) Prior Publication Data

US 2020/0377186 A1    Dec. 3, 2020

Related U.S. Application Data

(60) Provisional application No. 62/855,683, filed on May 31, 2019.

(51) Int. Cl.
*B63H 21/20*    (2006.01)
*H01M 10/48*    (2006.01)
(Continued)

(52) U.S. Cl.
CPC .......... *B63H 21/20* (2013.01); *H01M 10/425* (2013.01); *H01M 10/482* (2013.01);
(Continued)

(58) Field of Classification Search
CPC ............ B63H 21/20; B63H 2021/202; H01M 10/482; H01M 10/425; H01M 50/20; H01M 50/24; H01M 2220/20; H01M 2010/4271
(Continued)

(56) References Cited

U.S. PATENT DOCUMENTS

| 10,096,809 B2 | 10/2018 | Kanamura et al. |
| 2006/0228960 A1* | 10/2006 | Durling .................... B63G 8/08 440/88 F |

(Continued)

FOREIGN PATENT DOCUMENTS

| DE | 3627931 A1 | 3/1988 |
| FR | 2929589 A1 | 10/2009 |

(Continued)

OTHER PUBLICATIONS

English translation of Office Action for TW Application No. 109118116, dated Mar. 19, 2021.
(Continued)

*Primary Examiner* — Daniel V Venne
(74) *Attorney, Agent, or Firm* — Dorsey & Whitney LLP

(57) ABSTRACT

Embodiments of the disclosure are drawn to apparatuses and methods for packaging and distributing a marine energy storage system. Battery packs including one or more battery cells and a compliant layer enclosed in a sealed housing are disclosed. Vessel hulls with battery packs structurally integrated are disclosed. Vessel hulls with battery packs mounted to an inner surface of an outer hull are disclosed. Vessel hulls including compartments for inserting battery packs are disclosed. Vessel hulls including battery packs mounted in a ballast of the hull are disclosed.

28 Claims, 25 Drawing Sheets

(51) Int. Cl.
*H01M 10/42* (2006.01)
*H01M 50/20* (2021.01)
*H01M 50/24* (2021.01)

(52) U.S. Cl.
CPC ........... *H01M 50/20* (2021.01); *H01M 50/24* (2021.01); *B63H 2021/202* (2013.01); *H01M 2010/4271* (2013.01); *H01M 2220/20* (2013.01)

(58) Field of Classification Search
USPC .............................................. 440/6
See application file for complete search history.

(56) References Cited

U.S. PATENT DOCUMENTS

| | | | | |
|---|---|---|---|---|
| 2009/0068547 | A1* | 3/2009 | Ambrosio | B60L 58/19 429/50 |
| 2012/0000409 | A1* | 1/2012 | Railey | B63H 21/17 114/55.5 |
| 2012/0263980 | A1* | 10/2012 | Soukhojak | F28D 15/00 429/50 |
| 2014/0329130 | A1* | 11/2014 | Kanamura | H01M 10/4235 429/144 |
| 2015/0037641 | A1* | 2/2015 | Pinon | H01M 50/502 429/99 |
| 2016/0111695 | A1* | 4/2016 | Kanamura | H01M 10/058 29/623.1 |
| 2017/0025646 | A1* | 1/2017 | Ota | H01M 50/10 |
| 2017/0279101 | A1* | 9/2017 | Sago | H01M 50/449 |
| 2018/0198120 | A1* | 7/2018 | Kubota | H01M 4/483 |
| 2018/0208286 | A1* | 7/2018 | MacFarlane | B63H 5/07 |

FOREIGN PATENT DOCUMENTS

| | | | | |
|---|---|---|---|---|
| TW | 201145640 | A | 12/2011 | |
| TW | 201206739 | A | 2/2012 | |
| TW | 201206739 | * | 6/2012 | B60V 3/00 |

OTHER PUBLICATIONS

International Search Report and Written Opinion for Application No. PCT/US2020/035213, dated Oct. 13, 2020.
Invitation to Pay Additional Fees for PCT Application No. PCT/US2020/035213, dated Aug. 14, 2020.
"Greenline Hybrid Boat", Motor Boat & Yachting, URL=https://www.youtube.com/watch?v=JbTXCunvAEs, 2:19-2:50, last accessed Sep. 23, 2020.
"Yak-Power YP-BBK Power Pack Battery Box", https://www.amazon.com/Yak-Power-YP-BBK-Power-Pack-Battery/dp/B06Y15F861, last accessed Sep. 23, 2020, 4 pages.
English translation of Office Action for TW Application No. 109118116, dated Sep. 3, 2021.

* cited by examiner

MARINE VESSEL WITH HULL-INTEGRATED ELECTRICAL ENERGY STORAGE FOR VESSEL PROPULSION

CROSS-REFERENCE TO RELATED APPLICATIONS

This application claims the benefit of priority pursuant to 35 U.S.C. § 119(e) of U.S. provisional patent application No. 62/855,683, filed 31 May 2019, entitled "APPARATUSES AND METHODS FOR MARINE ENERGY STORAGE," which is hereby incorporated by reference herein in its entirety.

TECHNICAL FIELD

This disclosure relates generally to energy storage systems for marine vessel propulsion.

BACKGROUND

Similar to automobiles, marine vessels may operate on electric power or a combination of electric and fossil-fuel power (e.g., hybrid). Onboard stored energy using lithium ion batteries enables ships to function more quietly while reducing fuel consumption and emissions. Currently, lithium ion batteries are used on larger vessels such as passenger/car ferries. These vessels have sufficient interior volumes and cargo weight capacities for storing the large racks of battery packs required for powering the vessel's operations. However, smaller vessels (e.g., 50 feet or less) such as workboats, fishing vessels, pleasure craft, and some military vessels, have substantially lower useful load fractions and insufficient spare volume capacity to install the required amount of lithium ion batteries to provide the desired hybrid and/or full electric operation. Furthermore, the moment induced by the addition of a large volume of batteries to a smaller vessel may adversely affect the center of gravity of the vessel, making it less stable and/or negatively modifying running trim angle potentially resulting in sluggish performance at hump, porpoising, and even dynamic instabilities.

SUMMARY

A marine vessel (also referred to as watercraft or boat) according to some embodiments of the present disclosure includes a hull, a propulsion system configured to propel the watercraft in electric and/or hybrid-electric mode, and an energy storage system for providing electrical energy to the propulsion system, the energy storage system comprising a plurality of battery packs integrated into the hull, wherein each battery pack of the plurality comprises one or more battery cells, a sealed housing enclosing the one or more battery cells, and at least one compliant layer between the housing and the one or more battery cells, wherein the compliant layer is configured to reduce transmission of vibrations from the hull to the one or more battery cells.

In some embodiments of the watercraft, each of the one or more battery cells comprises a first surface and a second surface opposite the first surface, wherein the at least one compliant layer is positioned against the first surface of a first battery cell, and the sealed housing includes a positive lug flange electrically coupled to a positive terminal of the one or more battery cells and a negative lug flange electrically coupled to a negative terminal of the one or more battery cells. In some embodiments, the at least one compliant layer comprises a first compliant layer substantially co-extensive with the first surface of the first battery cell. In some embodiments of the watercraft, each of the battery packs of the plurality comprises a plurality of the battery cells, and wherein the at least one compliant layer comprises a first compliant layer separating one or more of the plurality of battery cells from any adjacent battery cells. The positive terminals of each of the plurality of battery cells of an individual battery pack are electrically coupled to one another and negative terminals of each of the plurality of battery cells of the individual battery pack are electrically coupled to one another internal to the housing of the individual battery pack. In some embodiments, the battery cells of individual battery packs are enclosed in a vacuum bag with at least one compliant layer positioned between the vacuum bag and the sealed housing. In some embodiments, a dielectric fluid is provided within the housing of each battery pack of the plurality, the dielectric fluid being in direct contact with the one or more battery cells of an individual battery pack. In some embodiments, the dielectric fluid is fluidly coupled to a cooling loop external to the housing of the individual battery pack, the cooling loop configured to circulate the dielectric fluid into and out of the housing of the individual battery pack. In some embodiments, the dielectric fluid within each of the battery packs of multiple individual battery pack is fluid coupled to a single external cooling loop. The external cooling loop of the immersion cooling system of one or the multiple battery packs includes, in some embodiments, a heat-exchanger configured to transfer heat from the dielectric fluid to a second working fluid. In some embodiments, at least one of the plurality of battery packs is located in a ballast compartment or another wet area of the watercraft. In some embodiments, the propulsion system is a hybrid propulsion system, the watercraft is further equipped with a fuel tank for storing and providing fuel to the propulsion system.

In some embodiments, the hull of the watercraft comprises an outer hull and at least one of the plurality of battery packs is integrated with the outer hull. In some embodiments, the hull may include an outer hull and an inner hull, and at least one of the plurality of battery packs is positioned between the outer hull and the inner hull. In some embodiments, at least one of the plurality of battery packs is integrated into the hull at a location which is below a waterline of the vessel, for example when the vessel is operated in displacement mode. In some embodiments, one or more battery packs may be located at the bilge of the vessel. In some embodiments, the hull includes an outer hull and a plurality of internal braces (e.g., longitudinal and transverse braces) that attach to and extend inwardly from the outer hull. The plurality of internal braces may include a first internal brace attached to and extending from an inner surface of the outer hull, the first internal brace having a height above the inner surface of the outer hull. In some embodiments, some or all of the battery packs may be contained below the height of the internal braces. In some embodiments, internal braces of a same type and/or in a generally the same section of the vessel (e.g., a forward, amidships, or stem portion of the hull), may have substantially the same height. In other embodiments, internal braces of one type (e.g., transverse braces, which are also referred to as ribs or stringers) may have a different (e.g., smaller) height than internal braces of a different type (e.g., longitudinal braces, also referred to as beams). In some embodiments, one or more of the internal braces may extend above the inner hull, if present. In some embodiments, a first battery pack of the plurality is integrated into the hull on one side of the first internal brace and a second battery pack of the plurality is integrated into the hull on an opposite side of the first internal brace. In some embodiments, a first battery pack is electrically connected to the second battery pack via an electrical conductor that passes through the first internal brace. In some embodiments, the hull includes a plurality of internal braces including the first internal brace, and wherein the at least one of the plurality of battery packs substantially fills a space defined between adjacent internal braces. In some embodiments, the further includes an inner hull extending over and enclosing the space defined between the plurality of internal braces.

In some embodiments, the hull comprises an outer hull and an inner hull spaced from the outer hull to define a hull cavity, which is segmented into hull cavity portions by longitudinal and transverse structural members, and wherein a first battery pack is located in a first hull cavity portion and a second battery pack is located in a second hull cavity portion. In some embodiments, at least one of the plurality of battery packs conforms to a contour of the outer hull or of the inner hull. In some embodiments, at least one of the plurality of battery packs is spaced from the inner and outer hulls by respective mounts configured to reduce transmission of vibrations from the hull to the battery pack. In some embodiments, at least one of the plurality of battery packs is fixed such that it lies against the outer hull or the inner hull. In some such embodiments, the battery pack(s) is fixed to an inner surface of the outer hull. In some embodiments, at least one of the plurality of battery packs is removably coupled to the hull cavity.

A battery pack for a marine propulsion system according to some embodiments includes a battery cell having a first surface and a second surface opposite the first surface, a first compliant layer adjacent to the first surface, and a sealed housing surrounding the battery cell, the first compliant layer, wherein the sealed housing includes a positive lug flange electrically coupled to a positive terminal of the battery cell, and a negative lug flange electrically coupled to a negative terminal of the battery cell. In some embodiments, the battery pack include a second compliant layer adjacent to the second surface. In some embodiments, the battery pack includes a coolant loop adjacent to the first compliant layer. In some embodiments, the battery pack includes immersion cooling alternatively or additionally to the coolant loop. In some embodiments, the sealed housing of the battery pack further includes a coolant in-port and a coolant out-port. In some embodiments, the battery pack further includes an outgassing ventilation loop adjacent to the first compliant layer. In some embodiments, the sealed housing further includes a first outgassing port. In some embodiments, the sealed housing further includes a second outgassing port. In some embodiments, the outgassing ventilation loop is configured to circulate air passed over a desiccant through the battery pack. In some embodiments, the sealed housing further includes a sensor port operatively coupled to the battery cell, the sensor port configured to couple the battery cell to a battery management system. In some embodiments, the sealed housing further includes a mounting feature.

In some embodiments, the battery pack further includes an internal pressure regulation system configured to maintain a positive pressure in the sealed housing, the internal pressure regulation system including a pressure sensor, and an inlet/outlet port included in the sealed housing. In some embodiments, individual battery cell(s) of a battery pack may be solid state batteries. In some embodiments, the sealed housing comprises a fiberglass composite. In some embodiments, the fiberglass composite comprises a bidirectional S2-glass mat. In some embodiments, the sealed housing comprises a carbon fiber composite. In some embodiments, the sealed housing comprises a metallic material. In some embodiments, the first compliant layer includes a foam sheet.

In some embodiments, the sealed housing comprises a main housing comprising a first flange, and an end plate comprising a second flange, wherein the first flange is configured to engage the second flange to couple the main housing to the end plate. In some embodiments, the main housing and the end plate are bolted together. In some embodiments, the sealed housing is sized to apply a compressive force to the battery cell. In some embodiments, wherein the battery cell is removable from the sealed housing when the main housing is uncoupled from the end plate. In some embodiments, the battery cell and first compliant layer are potted with a resin. In some embodiments, the battery pack further comprises a vacuum bag surrounding the battery cell and first compliant layer and the sealed housing surrounds the vacuum bag. In some embodiments, the battery pack includes a plurality of battery cells, each battery cell of the plurality of battery cells having a first surface and a second surface opposite the first surface, and a first plurality of compliant layers, each compliant layer of the first plurality of compliant layers adjacent to the first surface of a corresponding one of the plurality of battery cells. In some embodiments, the plurality of battery cells are electrically coupled to one another. In some embodiments, the battery pack has a rectangular prism shape. In some embodiments, wherein the battery pack is a non-planar shape.

A method of forming a battery pack according to some embodiments of the present disclosure includes providing a battery cell, stacking a compliant layer on the battery cell to form a stack, wrapping the stack in a fiber mat, placing the stack wrapped in the fiber mat into a mold, applying a vacuum to the mold, while applying the vacuum, providing a resin to the mold, and removing the battery pack from the mold after the resin has cured. In some embodiments, the mat includes a penetration for an electrical connector to the battery cell and the method further comprises installing a seal over the penetration prior to applying the vacuum. In some embodiments, the method further comprises post-curing the resin at an elevated temperature. In some embodiments, the resin is a room temperature cure resin. In some embodiments, the fiber mat is a glass fiber mat. In some embodiments, the method further includes stacking a second battery cell on the compliant layer to form the stack such that the compliant layer is disposed between the battery cell and the second battery cell. In some embodiments, the mold has a curved surface and placing the stack wrapped in the fiber mat into the mold comprises curving the stack and the fiber mat. In some embodiments, the method further includes placing the stack in a vacuum bag prior to wrapping the stack in the fiber mat.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
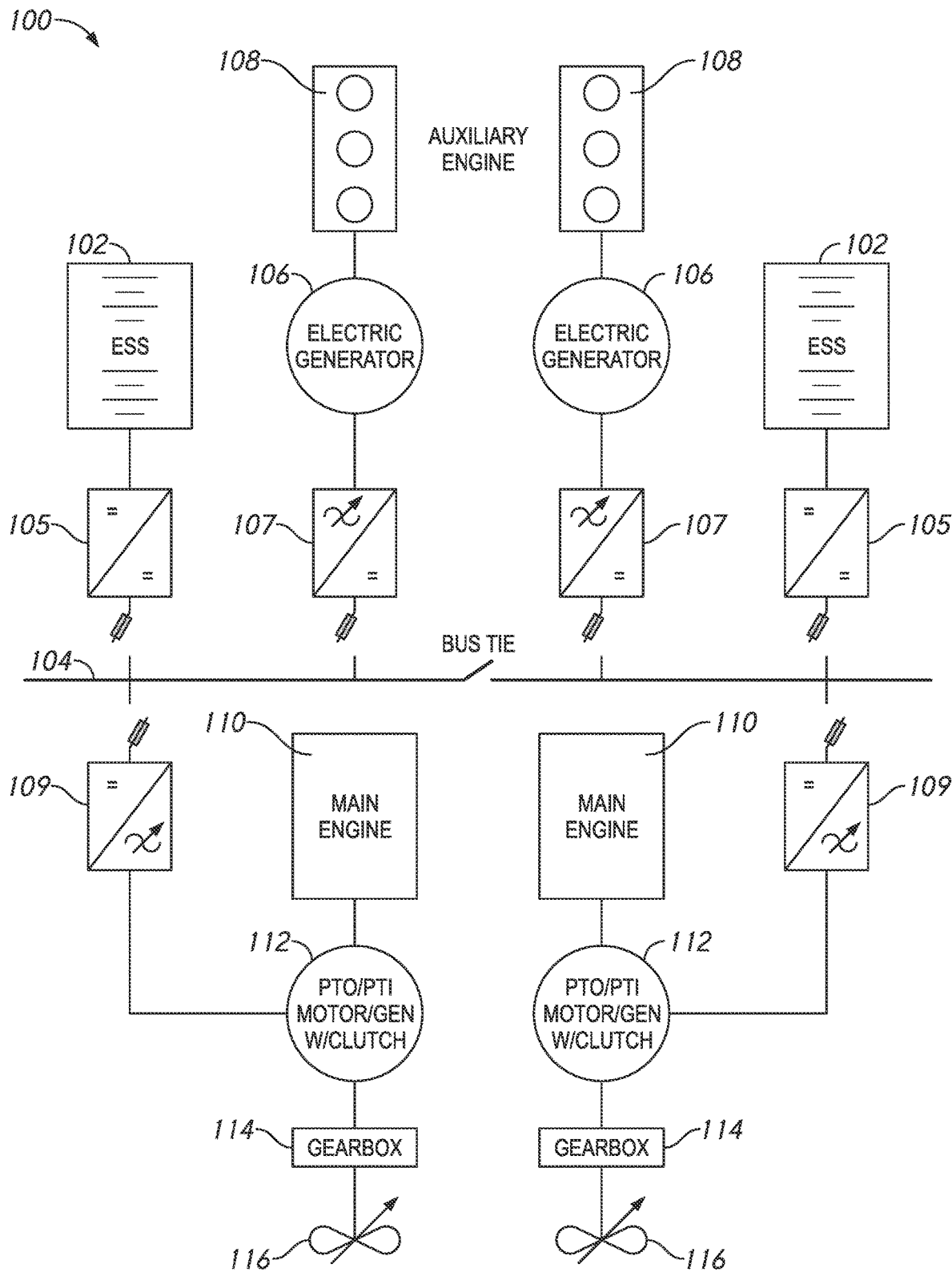
FIG. 1 shows a block diagram of an example of a parallel hybrid system.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Marine vehicle propulsion may be divided into three main categories: all fossil fuel, hybrid fossil fuel-electric, and all electric. While some all electric vessels exist, the majority of marine vessels that use electric power utilize hybrid systems. In the context of this application, the term vessel and vehicle may be interchangeably used. Hybrid propulsion systems may have a variety of configurations, for example, parallel systems and series systems. In a parallel system, as described further below with reference to the example in FIG. 1, a motor/generator that powers a propeller may be coupled to both an electric power source and an internal combustion engine in parallel. The motor/generator may include a clutch that allows it to engage the electric power source and/or the internal combustion engine to power the propeller. In contrast, in a series system, as described further below with reference to the example in FIG. 2, internal combustion engines may be coupled to electric generators to provide power to a DC or AC grid. An electric motor directly connected to the propeller shaft may be coupled to the DC or AC grid and receive electric power from the electric generators coupled to the internal combustion engines and/or from an electric power source (e.g., batteries). Other hybrid systems may be used, including systems that are a combination of parallel and series hybrid systems. The words ship, boat, watercraft, marine vessel or simply vessel may be used interchangeably throughout this disclosure without implying any limitation as to the type of marine vessel to which the examples of the present disclosure apply. The examples herein may be utilized in marine vessels of various types (e.g., submersible, semi-submersible, or surface crafts) or sizes.

FIG. 1 shows a block diagram of an example marine propulsion system, in this case an example of a parallel hybrid system 100. The parallel hybrid system 100 may include one or more energy storage systems (ESS) 102 coupled to an electric bus 104 by a direct current-to-direct current (DC/DC) power controller 105, one or more electric generators 106 coupled to the electric bus 104 by a direct current-to-alternating current (DC/AC) power controller 107 and further coupled to an auxiliary engine 108, which may be a diesel or other type of internal combustion engine. The parallel hybrid system 100 may further include one or more main engines 110, which may be a diesel or other type of internal combustion engine, a nuclear reactor or another type of fuel-based engine, coupled to an electric motor/generator 112 with a power take off/power take in drive (PTO/PTI) and clutch, which is in turn coupled to a gear box 114 and the electric bus 104 via DC/AC power controller 109. The gear box 114 may couple a propeller, waterjet, or any other suitable type of propulsor 116 that converts power to propulsive thrust, to the parallel hybrid system 100. System with DC bus is shown but electrical architecture could employ either DC or AC bus with appropriate controllers.

In hybrid system 100, ship propulsion power is from either 1) the ESS 102 optionally augmented with auxiliary fuel-based (e.g., diesel) engines 108, 2) from the main engine 110, or 3) from both the ESS 102 and the main engine 110 simultaneously. The electric motor/generator 112 converts energy from the ESS 102 to power the propeller, waterjet, or other type of propulsor 116. When the clutch of the electric motor/generator 112 disconnects the main engine 110, the vessel is powered solely by ESS 102 power in an all-electric mode. In some operational conditions, the propeller may be decoupled from the main engine 110 using the clutch, and power from the main engines 110 can be converted into energy for recharging the ESS 102. In this case, the electric motor/generator 112 serves as a generator. In some operational conditions, the propeller may remain coupled to the main engine 110 and power from the main engines 110 can be converted into energy for recharging the ESS 102 while also providing power to the propeller, waterjet, or type of propulsor 116. In some embodiments, the PTO/PTI may be replaced by a torque ring motor/generator coupled to the main drive shaft of the electric motor/generator 112. As described, the operative coupling of the engines and various electrical components (e.g., ESS 102) of the system 100, e.g., via the clutch, permits re-configurability of the hybrid system 100 for operation in fuel-based propulsion mode (i.e. main engine, such as an internal combustion engine, only), hybrid-electric or simply hybrid mode (i.e. main engine and electrical energy, such as provided by ESS 102, combined), or all-electric propulsion mode, in which the marine vessel is propelled solely by ESS 102 power.

Figure 2:
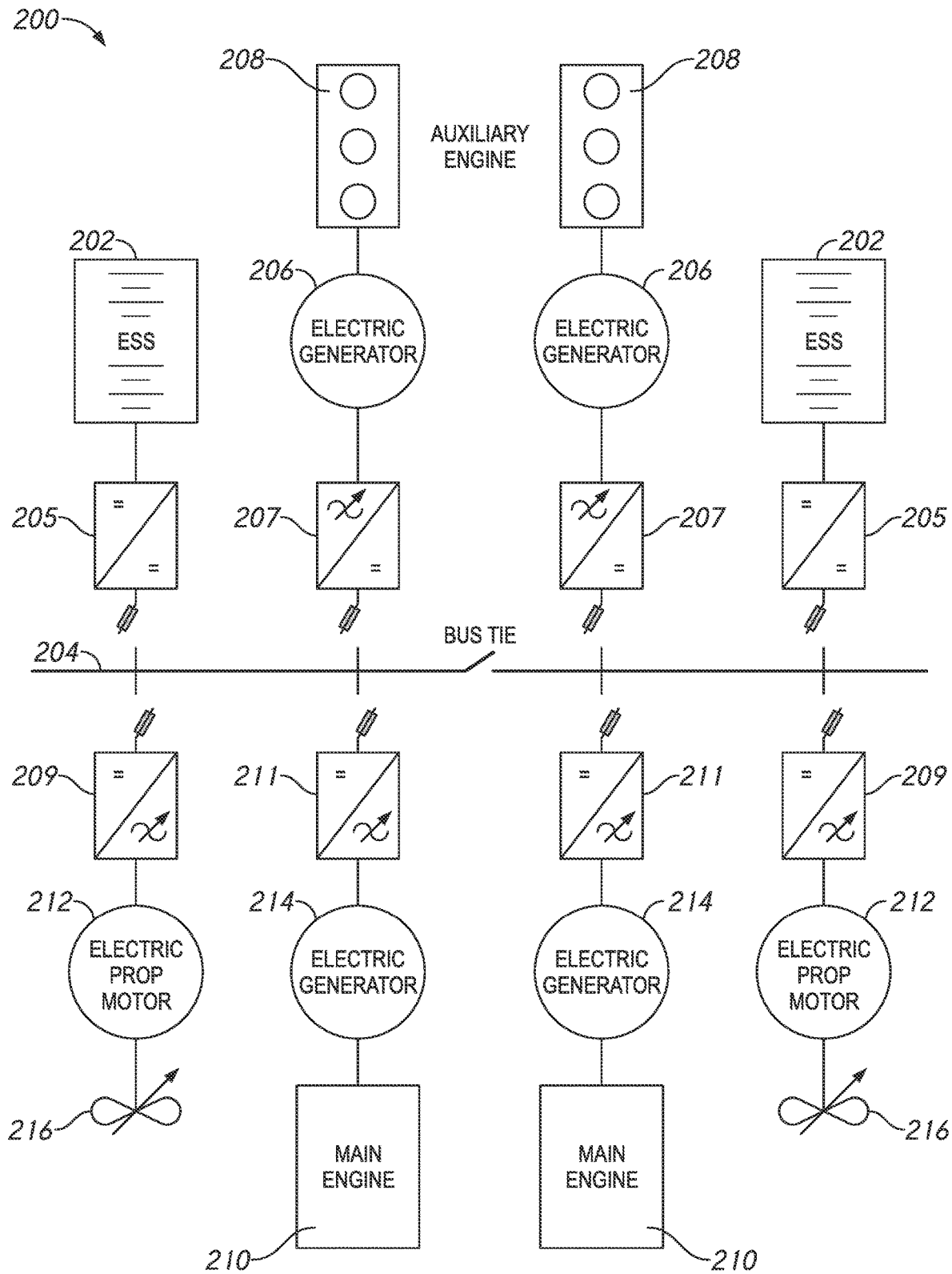
FIG. 2 shows a block diagram of an example of a series hybrid system.

FIG. 2 shows a block diagram of an example of a marine propulsion system, in this case an example of a series hybrid system 200. The series hybrid system 200 may include one or more energy storage systems (ESS) 202 coupled to an electric bus 204 by a DC/DC power controller 205, one or more electric generators 206 coupled to the electric bus 204 by a DC/AC power controller 207 and further coupled to an auxiliary engine 208, which may be a diesel, another type of internal combustion engine, or other fuel-based engine. The series hybrid system 200 may include one or more main engines 210 coupled to an electric generator 214, which is in turn coupled to the electric bus 204 by DC/AC power controller 211. The main engine 210 may be a diesel, another type of internal combustion engine or other suitable fuel-based engine. The series hybrid system 200 may include one or more propeller motors 212 (e.g., electric motors) coupled to the electric bus 204 via DC/AC power controllers 209. The propeller motors 212 may drive one or more propellers 216 of the marine vessel. System with DC bus is shown but electrical architecture could employ either DC or AC bus with appropriate controllers.

In series hybrid system 200, propulsion power may be from electric propeller motors 212, which are powered from a DC grid of the marine vessel. Energy may be supplied to the DC grid by main engines 210, generators 214, and/or the ESS 202. Auxiliary engines 208 and electric generators 206 may also provide supplemental power. A ship utilizing series hybrid system 200 may be selectively powered by engines only, hybrid (combined), or all-electric propulsion. For example, the ESS 202 may be decoupled from the DC grid while the main engine 210 remains coupled via generator 214 for providing propulsive power to the vessel from the main engine 210 only. Optionally, auxiliary engine 208 may also be coupled to the DC grid via generator 206. In hybrid propulsion, for example, both the main engine 210 via generator 214 and the ESS 202 may be coupled to the DC grid. Optionally, auxiliary engine 208 may also be coupled to the DC grid via generator 206. In all-electric propulsion, for example, only the ESS 202 is coupled to the DC grid. While not illustrated, in some embodiments of the present disclosure, a marine vessel may be configured as a purely electrically propelled vessel and in some such embodiments, the main engine(s), which in a hybrid-electric system are typically fuel based, and any components essential for their operation (e.g., fuel tank(s)) may be omitted.

Typically, the energy storage system of an electric or hybrid propulsion system includes one or more batteries. Configuring a marine vessel as an all-electric or a hybrid propulsion vessel may be challenging, especially for smaller watercraft, because of the significant volume and weight requirements of existing batteries and marine electrical propulsion solutions. Furthermore, even if the marine vessel has sufficient volume and weight capacity, not all of the physically available volume in the vessel may be used for battery storage due to physical limitations presented by the ship design, for example transverse bulkheads and internal structural framing and/or because the available internal volume and weight capacity may be needed for performance of the vessel's function (e.g., needed passenger-carrying and/or cargo load capacity). As an alternative solution, the batteries could be stored external to the interior volume of the vessel on or above deck, which may detrimentally impact the vertical center of gravity of the vessel, which can lead to the danger of capsizing and/or improper planing of the vessel, or externally to the hull which may degrade the vessel's performance in other ways. Battery packaging topologies and arrangement of ESS components for use by an electric or hybrid-electric marine propulsion system may address existing challenges enabling a greater packing factor of the electrical energy storage device(s) and, consequently, higher installed battery capacity for marine vessels.

Battery packs according to the present disclosure, examples of which are described further below, may enable greater installed battery capacity on a marine vessel while reducing the transmission of vibration to the battery cells and water intrusion into the battery packs. Examples according to the present disclosure may be used in all-electric and hybrid-electric (or simply hybrid) marine propulsion systems, such as systems 100 and 200 described above. In accordance with the examples herein, the battery packs and/or other components of the ESS may be integrated into the hull of the vessel. Battery packs in accordance with the examples herein may allow for arrangement and distribution of ESS components throughout the marine vessel in a manner that may not be feasible with existing battery packaging technologies. For example, vibration reducing and water resistance or waterproofing features of the battery packs described herein may enable the battery packs to be arranged virtually anywhere in the hull, e.g., below the vessel's waterline and/or may be incorporated or integrated into the hull's structure (e.g., by laminating the battery pack(s) into the during hull lamination of a composite vessel and into structure of the vessel, such as the vessel's hull, that may be subject to vibrations and/or water intrusion. Moreover, some of the example arrangements of ESS components described herein may provide the further advantaging of improving the vertical center of gravity (VCG) of the vessel and/or provide greater flexibility in the optimization of the longitudinal center of gravity (LCG) of the vessel.

Figure 3:
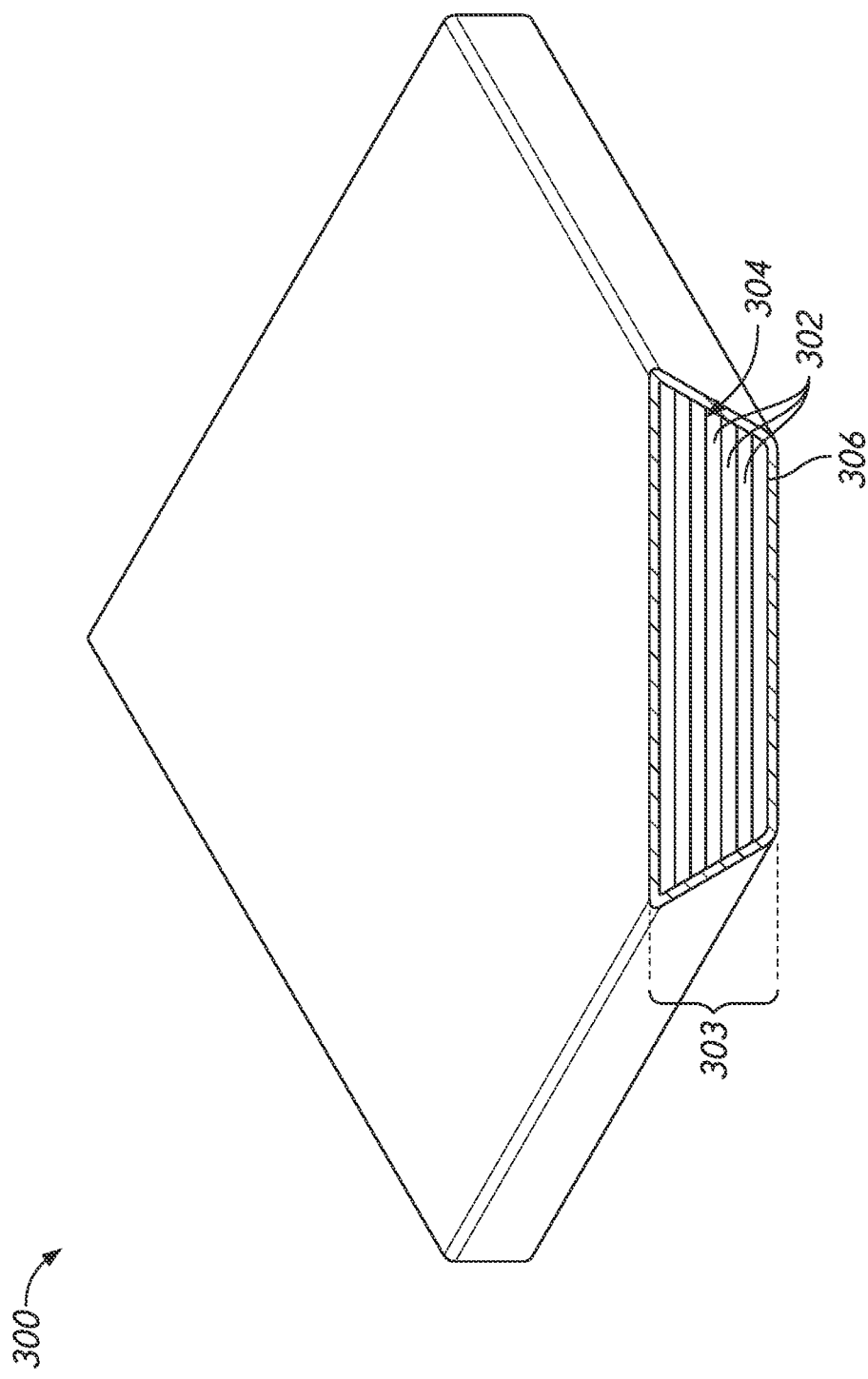
FIG. 3 is an illustration of a portion of a battery pack according to examples of the disclosure.

FIG. 3 is an illustration of a battery pack 300 in accordance with examples of the present disclosure, with a portion of the battery pack cut away to show internal structure of the battery pack. The battery pack 300 may include one or more battery cells 302, one or more compliant layers 304, and a sealed housing 306. In embodiments where the battery pack 300 includes multiple battery cells 302, the compliant layers 304 may be arranged to form a stack 303 of alternating layers of battery cells 302 and compliant layers 304. In some embodiments, in addition to including compliant layers 304 between the battery cells 302, compliant layers 304 may be included between the battery cells 302 and the sealed housing 306 at either end of the stack 303. In some embodiments, the battery cells 302 and compliant layers 304 may be arranged in the stack 303 such that a compliant layer 304 separates every two or more battery cells 302 rather than each individual cell. Although seven battery cells 302 and eight compliant layers 304 are shown in the example in FIG. 3, in other embodiments, any other suitable number of battery cells 302 and compliant layers 304, fewer or greater than in the illustrated example, and/or in any other suitable arrangement (e.g., separating different sub-groups of the cells) may be used in a battery pack 300 according to the present disclosure. In some embodiments, multiple stacks 303 of battery cells 302 and compliant layers 304 may be included in a single battery pack 300. In some embodiments, electrical fusing between cells may be included.

Each battery cell 302 may include an anode and a cathode separated by an electrolyte (not shown). In some embodiments, the battery cells 302 may be solid state battery cells. In some embodiments, the individual battery cells 302 may be flexible. In other words, the individual battery cells may be bendable such that they can be shaped to conform to any desired contour (e.g., a desired final shape for the battery pack so as to conform to the contours or surfaces of the vessel's hull). The individual battery cell of some such embodiments may be shaped to conform to a desired contour during the manufacturing of the battery packs and/or integration of the battery packs into the vessel. This may enable the forming, in some embodiments, of a battery pack 300 which has a non-planar (e.g., curved) shape. This may allow for example, for more customized integration of the ESS into the vessel's structure. Individual battery packs may be formed to have any desired, e.g., having exterior surfaces that follow any desired contour such as a curved contour of the hull, which may enable integration of the battery packs into the hull's structure. In some embodiment, other layers of the battery pack (e.g., the compliant layers 304) and the enclosing structure of the battery pack may also be flexible and remain flexible after the formation of the battery pack to allow the battery pack to be conformal to any desired surface, such as when placed against and/or integrated into the hull of the vessel. In some embodiments, the battery pack may remain flexible during its service life, such as when removably integrated into the hull. In other embodiments, the battery packs may be rigidized during or after installation, for example in some embodiments in which the battery packs are laminated into or otherwise fixedly attached to a surface of the hull. In some embodiments the battery pack 300 may be encased in a closed cell structural marine grade foam and conformed to the hull shape during the lamination of a composite hull. The battery cells 302 may have a variety of dimensions. For example, the battery cells 302 may be a rectangular prism such as a 12" square or 24" square. In another example, the battery cells 302 may have a different regular geometry such as a rectangular prism, which may be sized 12"×24". In another example, the battery cells 302 may be circular and have a radius of 12". These exemplary shapes and sizes are provided only as examples only. Virtually any regular or irregular shape or size may be used for the individual battery cells 302 and resulting battery pack 300. The battery cells 302 may be electrically coupled in series and/or in parallel, e.g., depending on the voltage and/or electrical current requirements for any given application. The individual battery cells 302 may be electrically connected to one another internally (i.e., within the housing of the battery pack) and operatively connected to a positive terminal and a negative terminal of the battery pack provided external to the battery pack for electrically coupling the battery pack to an electric bus of the vessel.

In embodiments of the present disclosure, one or more compliant layers may be provided between the battery cell(s) and the housing, between individual battery cells, or combinations thereof. The one or more compliant layers may be enclosed within the sealed housing of the battery pack. The one or more compliant layers may be configured to reduce transmission of vibrations from external sources (e.g., vibrations from the hull of a vessel, which may be caused by the vessels traveling on the water and/or operation of machinery on the vessel) to the interior of the battery pack (e.g., to the battery cells). The compliant layer 304 may be implemented using any suitable material which provides vibration dampening and/or tolerance for expansion and contraction of the battery cells 302 and/or other components of the battery pack 300. For example, the compliant layer material may be viscoelastic or elastic. In some embodiments, the compliant layer 304 may be implemented using a foam sheet. The foam sheet may be an open-cell foam or a closed-cell foam. In some embodiments, the foam is a high durometer foam. In some embodiments, the foam sheet is a rubber foam. In some embodiments, the compliant layer 304 may be a polymer (e.g., polyethylene). The compliant layer(s) may have two opposite major faces, one of which is positioned against a major face of a battery cell and the other one against the major face of another battery cell, another compliant layer, or the housing. In some embodiments, a compliant layer(s) positioned against a battery cell may have substantially the same shape as the battery cell and may be substantially co-extensive therewith. For example, in embodiments in which the battery cell is implemented as a sheet-like structure, the compliant layer may also be implemented as a sheet-line structure and may have substantially corresponding sheet size, having substantially the same or different (e.g., smaller) thickness than that of the battery cell. In some embodiments, the thickness of a compliant layer may be substantially constant providing for a substantially parallel layering of battery cell(s) and compliant layer(s) within a given battery pack. In other embodiments, one or more of the compliant layers may have a varying thickness, which may facilitate the forming of a battery pack of irregular geometry and/or may provide for non-equal spacing of the battery cell(s) from one another and/or the housing.

As shown in FIG. 3, the battery pack 300 may be enclosed within a sealed housing 306 configured to seal the interior of the battery pack 300 (e.g., battery cells 302) from water intrusion or other contaminants. The sealed housing 306 may be implemented using any suitable material which provides both water resistance and a contaminant barrier that is easily moldable or manufacturable into a desired shape such as polymer materials or metals. In some embodiments, the sealed housing 306 may be made from any suitable combination of materials (e.g., fiberglass or other fiber-reinforced composite) which when formed into the housing 306 is substantially waterproof. In some embodiments, the battery pack may include one or more additional water-impermeable layers between the housing and the battery cells for improving the water resistance or waterproofing the battery pack. In some embodiments, the battery pack may not be flexible after forming the battery pack and in some such embodiments, a substantially rigid material or a material that becomes substantially rigid after forming may be used. In some applications, the sealed housing 306 may be configured to provide additional vibration resistance. The sealed housing 306 may include multiple layers. For example, a polymer composite shell coated with a viscoelastic material. In this example, the rigid composite shell may provide water resistance and alignment of the stack 303 and the viscoelastic material may provide additional vibration and impact resistance. When multiple layers are used to form the sealed housing 306, not all layers be water resistant or waterproof. In some examples, the composite may include a resin with fiberglass fibers, graphite fibers, metallic fibers, and/or a combination thereof. The fiberglass may be bidirectional S2-glass mat in some embodiments. In some embodiments, the resin may be a room-temperature cured resin. In some embodiments, the resin may be an elevated temperature cured resin. In some embodiments, the resin may have an initial cured state at room temperature and a second cured state (e.g., post-cured state) at an elevated temperature. Although not shown, structural support connections may be integrated into the sealed housing 306. For example, features for mounting brackets or other mounting hardware may be included in the sealed housing 306. This may provide for easier mounting of the battery pack 300 in some applications.

While the example shown in FIG. 3 illustrates the basic components of a battery pack according to principles of the disclosure, battery packs may include additional components that facilitate the integration of the battery packs with an ESS in some applications. For example, terminals for electrically coupling the battery cells to a DC grid. Certain components of a battery pack according to the present disclosure may not be required for operation of the battery pack, but may be provided to enhance ease of use of an ESS. For example, temperature, internal pressure, and/or battery cell charge sensors may facilitate control of an ESS by a battery management system, diagnostic troubleshooting, and/or preventative maintenance. Some components may be included depending on the type of battery cell used to implement the battery cells in the battery pack. For example, some battery chemistries, such as some lithium ion-based chemistries, may utilize active cooling and/or systems for managing outgassing of the battery cells. In some examples, immersion cooling may be used, additionally or alternatively to other thermal management methods for the battery packs described herein. Elevated temperatures in some battery chemistries (e.g., Li-ion cells) may lead to instability causing thermal runaway (TR), which can lead to high heat generation and the release of flaming gases. During a thermal runaway, the high heat of a failing battery cell can propagate to the next cell, causing it to become also thermally unstable, which is referred to as cell-to-cell propagation. Sources of elevated temperature associated with thermal runaway may include out-of-range electrical commands or mechanical damage, such as penetration(s). Therma management methods currently in use for thermal management of Li-ion batteries typically use forced air or liquid cooling, the latter involving the circulating of a coolant such as a water-based coolant or other fluid which is typically electrically conductive, within coolant passages routed around the battery cells. In such cases, the coolant must be electrically insulated from the battery cell to prevent shorting the cell, which limits the amount of heat transfer, reducing the efficacy of heat dissipation. In accordance with the present disclosure, immersion cooling may be used in some embodiments, whereby the housing 306 of a battery pack 300 is flooded with dielectric fluid and the battery cells 302 are, consequently, immersed in the dielectric fluid. The dielectric fluid may be fully contained within the battery pack 300, or it may, in some embodiments, be circulated through an external cooling loop which in some cases includes a heat exchanger, for additional removal of heat from the battery pack. Arrangements that use immersion cooling may improve the thermal management of battery pack(s) 300 according to the present disclosure. While immersion cooling may provide enhanced thermal management and superior battery safety and/or performance, in other embodiments, conventional cooling techniques such as passive cooling, air or liquid forced through cooling loops, other active cooling methods, may be used instead of, or in combination with, immersion cooling.

Figure 4:
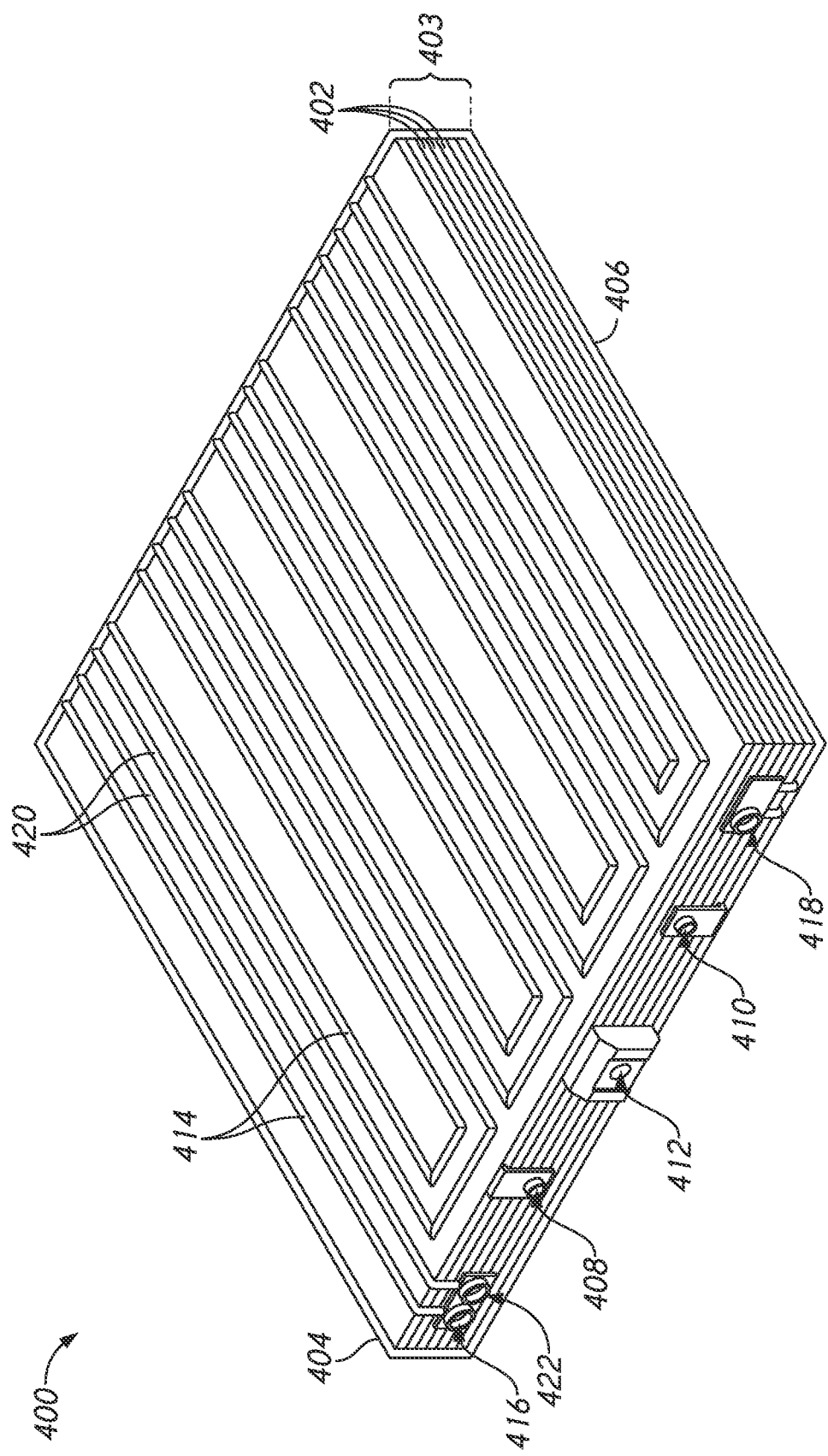
FIG. 4 is an illustration of a portion of a battery pack according to examples of the disclosure.

FIG. 4 is an illustration of a portion of a battery pack 400 in accordance with further examples of the present disclosure. Battery pack 400 may include one or more battery cells 402 and one or more compliant layers 404 disposed between the battery cells 402 to form a stack 403. The stack 403 may be enclosed in a sealed housing 406, a portion (top and two sides) of which is cut-away in the view in FIG. 4 to illustrate the arrangement of internal components of the battery pack. The battery pack 400 may include a positive lug flange 408 and negative lug flange 410, coupled to the positive and negative electrical outputs of the battery cells 402, respectively. The lug flanges 408 and 410 may be made of any electrically conductive material, which may be suitably shaped to allow the battery pack 400 to be coupled to an electric bus (e.g., bus 104 or 204, which may be a DC bus). While the lug flanges 408 and 410 and other components of the battery pack 400 that penetrate the housing are show in FIG. 4 on one of the lateral sides of the battery pack, in other embodiments, and depending on the desired arrangement of the battery packs (e.g., stacked or otherwise) within the hull, these components may be located on different sides of the housing, such as on one of the major sides (e.g., the top side in FIG. 4), on opposite lateral sides, or combinations thereof.

In some embodiments, the battery pack 400 may include a sensor port 412. The sensor port 412 may couple a battery management system (BMS) (not shown) or other monitoring device to the battery cells 402. In some embodiments, the sensor port 412 may be coupled to the individual battery cells 402 and/or sensors (not shown) on the individual battery cells 402 to allow monitoring of the individual battery cells 402. Sensors may include, but are not limited to, temperature sensors, pressure sensors, and chemical sensors. Additionally or alternatively, the sensor port 412 may allow access to one or more sensors that monitor the interior of the battery pack 400 as a whole. Examples include, but are not limited to, pressure sensors, temperature sensors, humidity sensors, and chemical sensors.

In some embodiments, the battery pack 400 may include a cooling system, also referred to as thermal management system. The cooling system may be configured to remove heat generated by the battery cells 402 from the battery pack 400. The cooling system may include components for passively and/or actively conducting heat away from the battery cells 402 to the exterior of the battery pack 400. The type of cooling used, e.g., whether active or passive, may be based, at least in part, on the chemistry of the battery cells 402. In some examples, lithium-ion batteries may be cooled using active cooling, such as forced air or liquid cooling. As shown in FIG. 4, the cooling system may include a cooling loop 414 coupled to an input port 416 and an output port 418. In some embodiments, the battery pack 400 may additionally or alternatively be passively cooled, such as by ambient air passing through the cooling loop 414, by immersion cooling or other suitable techniques or combinations thereof. In some embodiments, a fan (not shown) may be operatively associated with the input port 416 to blow air through the cooling loop 414. Air may exit through output port 418. In some embodiments, a liquid coolant (e.g., water, ethylene glycol, propylene glycol) may be pumped through cooling loop 414. One or more pumps (not shown) may be coupled to the cooling loop, such as being coupled to the input port 416, the output port 418, a conduit connecting the input and output ports, a conduit connecting the cooling loop of one battery pack 400 to another, or any suitable combination thereof. In some embodiments, the cooling system may be omitted.

In some embodiments (e.g., in some embodiments that use Li-ion battery cells), an immersion cooling thermal management (ICTM), or simply immersion cooling, system may be used which involves flooding the interior of the battery pack housing with a dielectric fluid. For example, in some embodiments in which the battery cells are sealed within the housing (e.g., housing 406 and housing 1506 in FIG. 24), some or substantially all of the interior volume of the housing not otherwise occupied by components of the battery pack may be filled by a dielectric fluid having a sufficiently high boiling point, for example a boiling point selected to ensure that the dielectric fluid remains substantially in liquid phase during expected thermal loading of the battery pack. With further reference to the example in FIG. 24, in some embodiments, the dielectric (i.e. non electrically-conductive) fluid 1520 is circulated through the interior volume of the battery pack 1500, as shown by internal loop 1551 of the immersion cooling system 1501. For example, the dielectric fluid 1520 may be fed into and routed out of the housing 1506 of the battery pack 1500 through the input port 1516 and output port 1518, respectively. The battery cells 1502 within the housing 1506 may be substantially immersed within the dielectric fluid 1520. In some embodiments, the dielectric fluid 1520 may pass and/or flow substantially unobstructed into and through interstitial spaces or cavities between the battery cells 1502, conductors 1505 electrically connecting the battery cells 1502, compliant layers 1504, etc.

Figure 24:
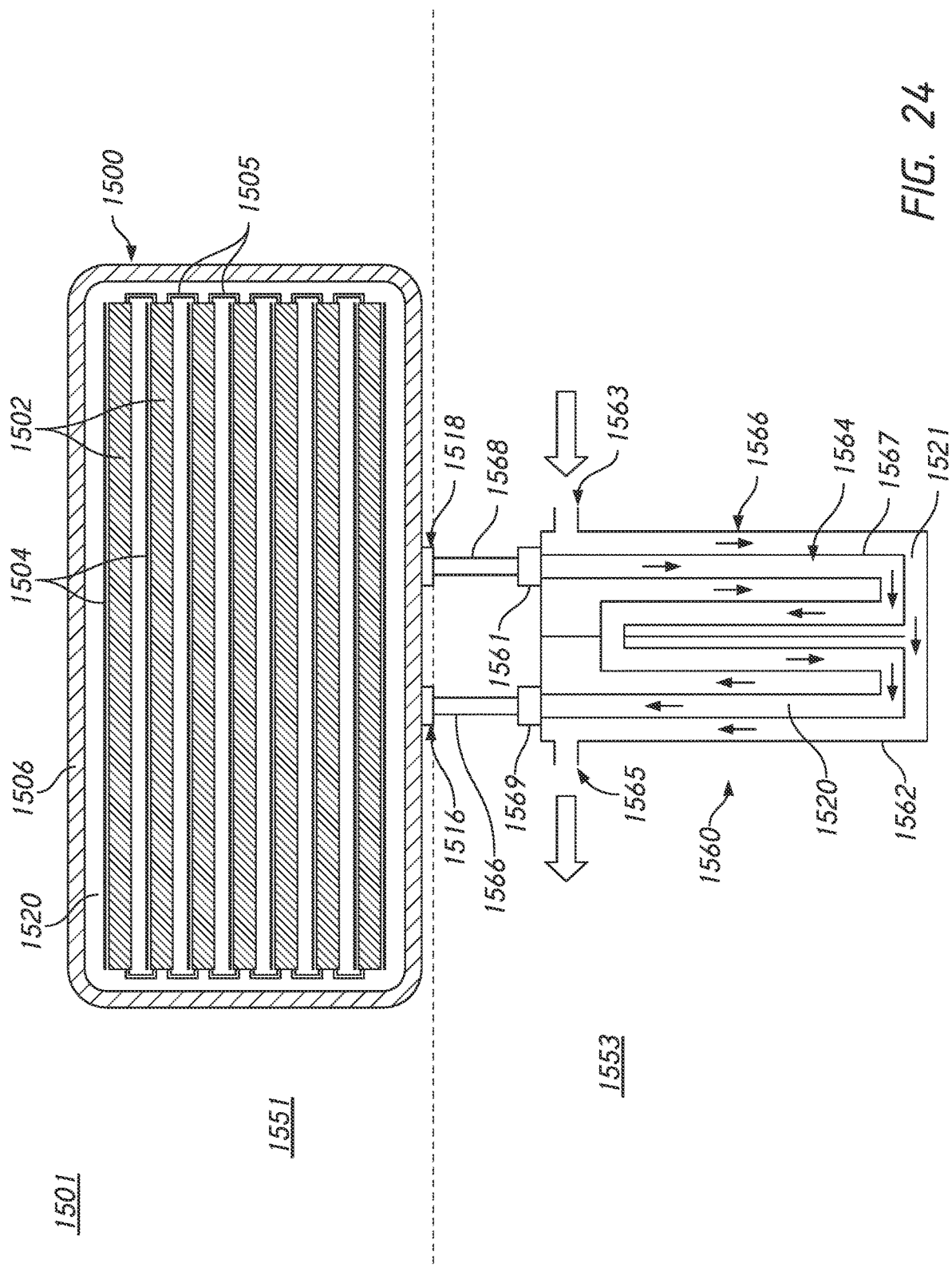
FIG. 24 is an illustration of internal and external cooling loops of an immersion-cooling thermal management system for battery pack(s) according to the present disclosure.

The dielectric fluid 1520 is optionally externally cooled in an external loop 1553 of the immersion cooling system 1501. The external loop 1553 may be cooled by active or passive means. For example, the external loop 1553 may pass the dielectric fluid through any suitable heat exchanger 1560. The heat exchanger 1560 may be implemented using a shell and tube heat exchanger as in the example FIG. 24, which may be configured for either parallel or counter-flow, or other suitable heat exchanger, such as but not limited to a double pipe heat exchanger, any suitable variant of a plate heat exchanger, or other suitable heat exchanger. A fluid pump (not shown) may be used to move the dielectric fluid 1520 through the external loop 1553 and into and out of the battery pack 1500. The external loop 1553 may include a reservoir 1562 fluidly coupled to the input and output ports 1516 and 1518, respectively, of the battery pack 1500 using first and second coolant lines 1566 and 1568, respectively. The external loop 1553 may be operatively coupled to any suitable passive or active heat exchanger, for example a liquid-to-liquid heat exchanger of any suitable design. The heat exchanger 1560 may be a liquid-to-liquid, which may be implemented, for example, as a shell and tube heat exchanger as shown in FIG. 24. Sea water or any other suitable liquid may be used as the second liquid in a liquid-to liquid heat exchanger. Other suitable liquids or fluids may be used to provide a second working fluid 1521 (also referred to as coolant fluid 1521) in the heat exchanger 1560. In some embodiments, a gas to liquid heat exchanger may be used, and in some such embodiments air or other readily available gas may be used as be the second working fluid 1521 to extract and dissipate heat from the dielectric fluid 1520. The flow path 1564 of the first working fluid (e.g., dielectric fluid 1520) and the flow path 1566 of the second working fluid 1521 of heat exchanger 1560 may be arranged for parallel flow, counter-flow, or a combination thereof. The dielectric fluid 1520 may flow through a conduit 1574 in a substantially straight or circuitous path through the reservoir 1562. The conduit 1567 fluidly connects the first (e.g., dielectric) inlet 1561 to the first (e.g., dielectric) outlet 1569 of the reservoir 1562. The second working fluid 1521 may be moved into and out of the heat exchanger 1560, in this example into and out of the reservoir 1562, via a second (e.g., coolant) inlet 1563 and a second (e.g., coolant) outlet 1565, respectively. The second working fluid 1521 may be moved through the reservoir 1562 via one or more pumps (not-shown) operatively associated with the second inlet 1563 and/or second outlet 1565 to flow along the second flow path 1566 of the external loop 1553. In other examples, the arrangement may be reversed in that the dielectric fluid may be connected to the second inlet and outlet of the reservoir, thus being contained along the second flow path 1566, while the coolant 1521 is fluidly coupled to the heat exchanger via the first inlet and outlet thereby following the flow path 1564 defined by the conduit 1657.

Lithium ion battery cells at certain levels of electrical input or output, may generate gasses during operation. Thus, and referring back to FIG. 4, the battery pack 400 may include an outgassing ventilation system. The outgassing ventilation system may be configured to release gasses from the interior of the battery pack 400 while still maintaining water resistance and/or substantially sealed nature, in some embodiments, of the battery pack 400. In the example shown in FIG. 4, the outgassing ventilation system may include an outgassing loop 420 and an outgassing port 422. In some embodiments, the outgassing port 422 may include a sealed vent. The vent may be activated by pressure in the outgassing loop 420. The vent may permit low pressure outgassing external to the battery pack 400. In some examples, compliant layers 404 may provide adequate circulation of the gasses. In these examples, the outgassing loop 420 may be omitted and only the outgassing port 422 may be included.

Depending on the battery chemistry of the battery cells 402, the outgassing ventilation system may be omitted. For example, some solid state battery chemistries may not experience outgassing. For some battery chemistries, the compliant layers 404 may provide resiliency sufficient to compensate for outgassing of the battery cells 402.

In some embodiments, the outgassing ventilation system may be used as a moisture control system instead of or in addition to outgassing. The outgassing ventilation system may be expanded to include both an inlet port and an output port (not shown). The moisture control system may allow internal ventilation of the battery pack 400. In some embodiments, an air dryer (e.g., desiccant) may be included to augment moisture removal.

In embodiments of the battery pack 400 that include the cooling system and/or outgassing ventilation system, the cooling loop 414 and/or outgassing loop 420 may be disposed between the battery cells 402 and the compliant layers 404 in some embodiments. The cooling loop 414 and/or outgassing loop 420 may be embedded in the compliant layers 404 in some embodiments. The cooling loop 414 and/or outgassing loop 420 may include plastic tubing and/or metal tubing in some embodiments. In embodiments that use immersion cooling, the tubing of the cooling loop 414 is omitted and the dielectric cooling fluid is allowed to circulate substantially freely within the battery pack, such as in voids between components of the battery pack, along passages formed in the compliant layers 404, or combinations thereof.

In some embodiments, the battery pack 400 may optionally include an internal pressure regulation system (not shown) configured to maintain pressure within the interior of the battery pack 400. In some examples, the internal pressure regulation system may include a pressure inlet/outlet port, which may be connected to an internal distribution circuit. The pressure inlet/outlet port may be similar to outgassing port 422 in some embodiments. In some embodiments, the outgassing port 422 may additionally or alternatively function as the pressure inlet/outlet port. The internal distribution circuit may monitor pressure within the battery pack 400. The internal distribution circuit may activate the pressure inlet/outlet port to maintain a suitable low positive pressure inside the battery pack 400. The positive pressure may mitigate against migration of water or contaminants into the battery pack 400. The internal pressure regulation system may provide a way to regulate the internal pressure of the battery pack 400 when ambient pressure conditions vary. Ambient pressure conditions may vary considerably for some marine vessels or for certain locations on a marine vessel. In some embodiments which utilize immersion cooling, some amount of boiling of the dielectric fluid may occur. In some such embodiments, the internal pressure regulation system or other appropriate pressure relief mechanism may be used to reduce the risk of over pressurizing the battery pack 400 due to the boiling of the dielectric flooding the interior of the battery pack. In some embodiments, a pressure relief valve may be incorporated into internal or external cooling loop(s) associated with the battery pack 400 for pressure relief without compromising the operation of the immersion cooling system and generally of the battery pack 400. In some embodiments, the pressure relief may be provided along a conduit that fluidly conducts the dielectric fluid but is located external to the housing of the battery pack. In some embodiments, the pressure relief valve may be automatically regulated by the internal distribution circuit. In some embodiments, the internal cooling loops of multiple battery packs may be connected to a single external loop such that one or more pumps and/or heat exchangers may be used to cool two or more battery packs.

Various approaches may be used to fabricate battery packs that provide resistance to vibration and water intrusion, such as the example battery packs shown in FIGS. 3 and 4. In some examples, a sealed housing of the battery pack may be formed around a stack of battery cells and compliant layers. In other examples, the sealed housing may be formed separately and the stack installed within the sealed housing after formation. The fabrication method used may be based on the type of materials used for the sealed housing, the materials used for the battery cells, or other desired characteristics of the battery pack (e.g., removability of the battery cells from the sealed housing).

In some examples, a stack of battery cells and compliant layers may be potted with a resin and/or a resin-based composite to protect the interior of the battery pack from water intrusion. In some applications, this fabrication approach may simplify embedding battery packs in structures of marine vessels.

Figure 5:
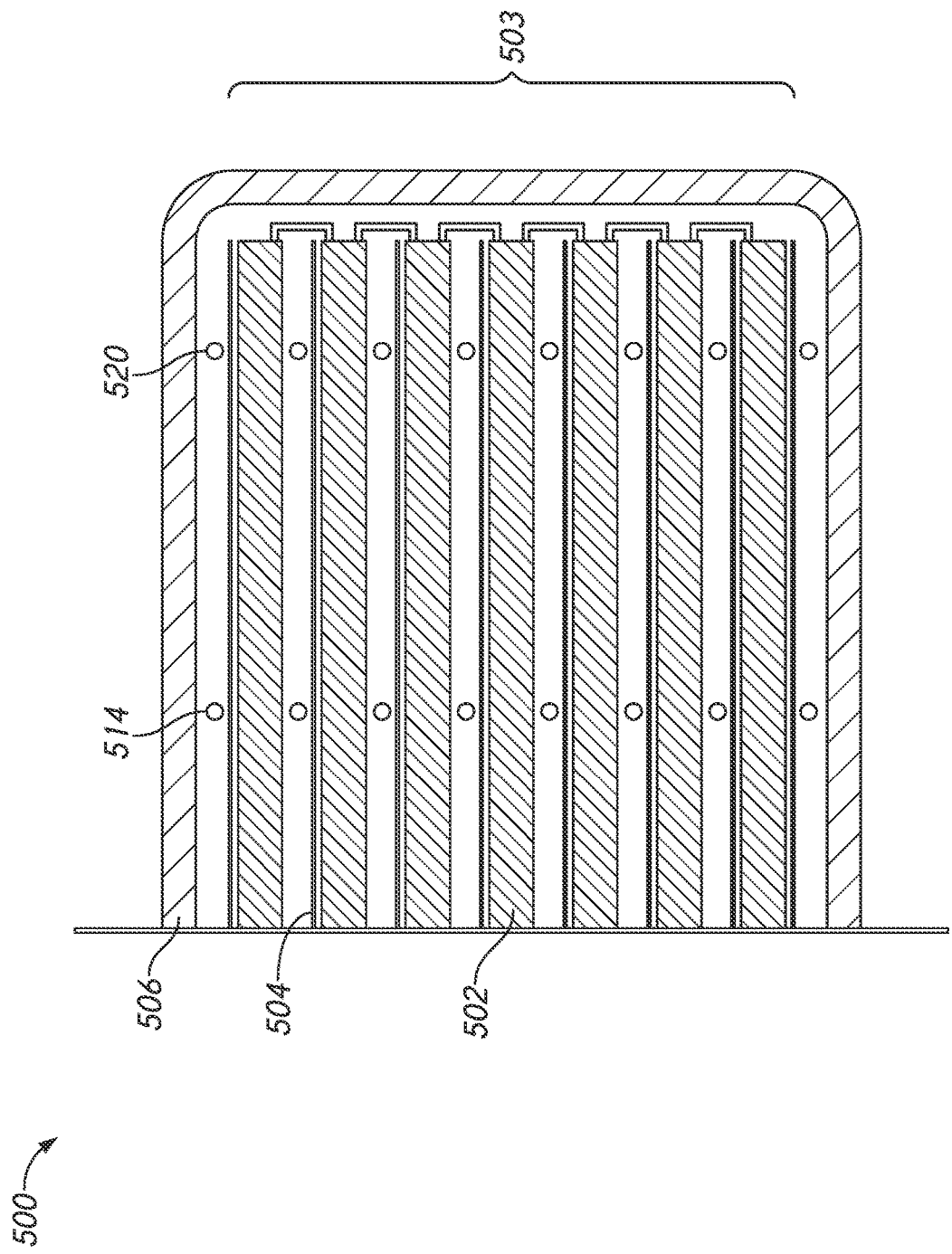
FIG. 5 is an illustration of a portion of a battery pack according to examples of the disclosure.

FIG. 5 is an illustration of a portion of a battery pack 500 in accordance with examples of the present disclosure. Battery pack 500 may include one or more battery cells 502, compliant layers 504, a cooling loop 514, and an outgassing loop 520 in a stack 503. The stack 503 may be enclosed in a sealed housing 506. Battery pack 500 may be a permanently sealed pack with a potted stack 503 in some embodiments.

To form the battery pack 500 in some embodiments, the stack 503 may be wrapped in a fiber mat (e.g., glass fiber, carbon fiber). In some embodiments, the fiber mat may include or may be cut to include penetrations for connectors (e.g., positive and negative lug flanges, sensor ports, cooling input and output ports, etc.). In other embodiments, the penetrations may be cut after curing. Seals may be installed around penetrations for the connectors. The wrapped stack 503 may then be placed in a metal mold that may be machined to the final desired shape of battery pack 500. In some embodiments, the mold is formed of two halves and bolted together after the wrapped stack 503 is placed inside. In some embodiments, a continuous O-ring may be installed in a bolted flange which may permit an internal vacuum. While a vacuum is maintained the wrapped stack 503 may be potted using vacuum assisted resin transfer molding (VARTM) with a resin, such as a room temperature cure resin. Following an initial cure at room temperature, the battery pack 500 is removed from the mold. The battery pack 500 may then be post cured at an elevated temperature if needed to achieve additional structural properties (e.g., hardness, stiffness). The post-cure temperature does not exceed the storage temperature of the battery cells 502. This fabrication method for battery pack 500 may result in a potted stack 503 structurally encased in a fiber composite housing.

In some applications, potting the elements of the stack (e.g., battery cells, compliant layers, outgassing loop) may be undesirable. For example, potting with a resin may inhibit the resiliency and/or vibration dampening properties of the compliant layers. Potting may inhibit the functionality of the outgassing ventilation system in some examples. However, potting methods may be desirable to form the sealed housing for integrating the battery pack into a structure and/or providing resistance to water intrusion. In some applications, a barrier may surround the stack to protect the interior elements of the battery pack from being potted with resin while still allowing the sealed housing to be potted. The barrier may be implemented using any suitable material that is resistant to resin intrusion. For example, a vacuum bag or other vacuum barrier may be used to surround the stack.

Figure 6:
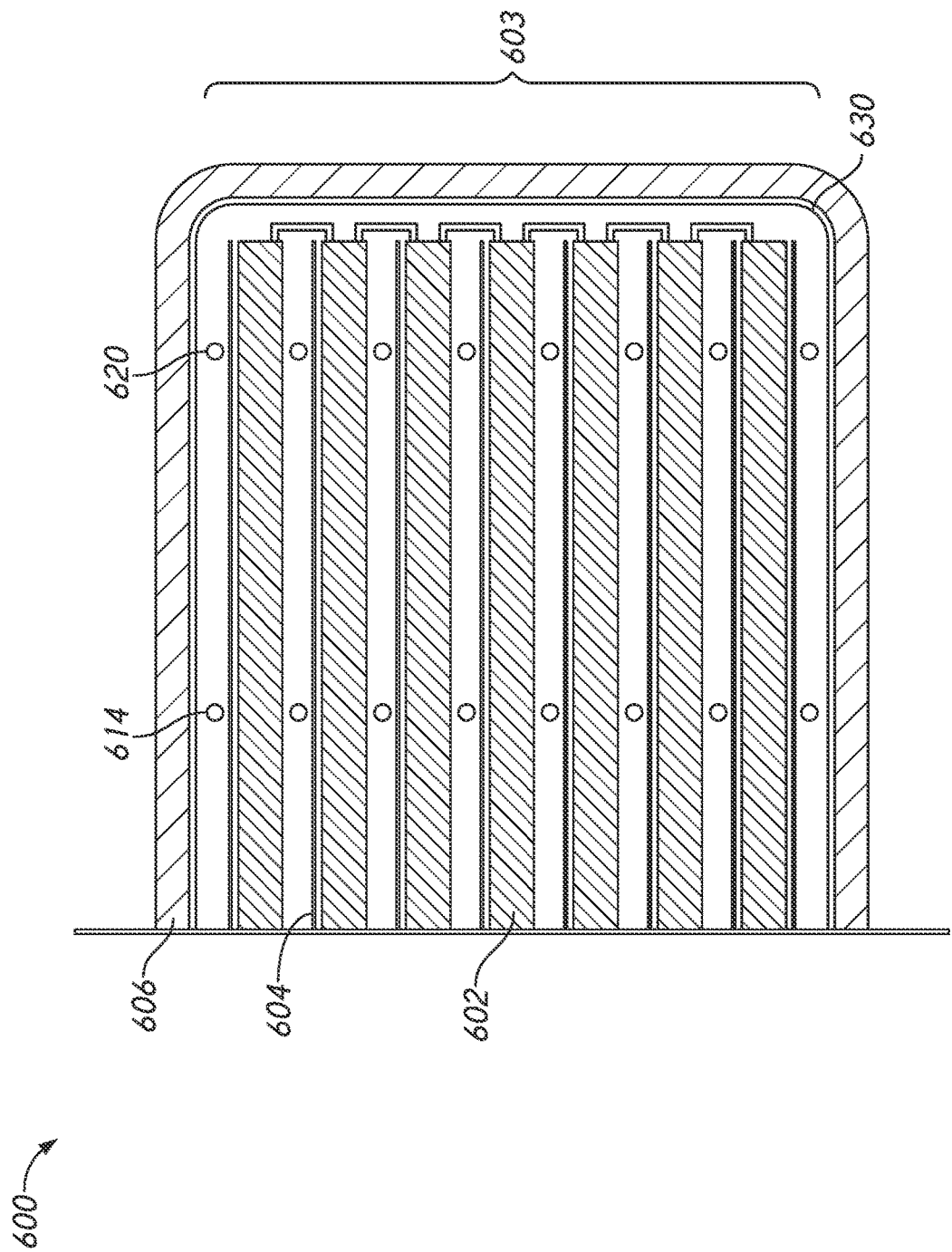
FIG. 6 is an illustration of a portion of a battery pack according to examples of the disclosure.

FIG. 6 is an illustration of a portion of a battery pack 600 in accordance with examples of the present disclosure. Battery pack 600 may include one or more battery cells 602, compliant layers 604, a cooling loop 614, and an outgassing loop 620 in a stack 603. The stack 603 may be enclosed in a vacuum bag 630 and a sealed housing 606. Battery pack 600 may be a permanently sealed pack with an unpotted stack 603 in some embodiments.

To form the battery pack 600 in some embodiments, the stack 603 is vacuum bagged in vacuum bag 630. A fiber mat is then wrapped around the bagged stack 603. In some embodiments, the fiber mat may include or may be cut to include penetrations for connectors (e.g., positive and negative lug flanges, sensor ports, cooling input and output ports, etc.). In other embodiments, the penetrations may be cut after curing. The entire assembly (vacuum bagged stack 603 with fiber overwrap) may then be placed in a metal mold that may be machined to achieve the final shape for the battery pack 600. The mold may be in two halves and bolted together. A continuous O-ring may be installed in the bolted flange which may permit an internal vacuum. In some embodiments, the mold may be sized to provide a slight interference fit with the stack 603 for compression preloading. The preloading may provide resistance to the effects of impacts and vibration on the stack 603.

While the stack 603 is vented to ambient air, the pack mold is potted using VARTM with a resin, such as a room temperature cure resin. After an initial cure, the mold is removed from the battery pack 600. In some embodiments, the battery pack 600 may then be post cured at an elevated temperature. This post-cure temperature does not exceed the battery cell 602 storage temperature. This fabrication method may produce a battery pack 600 with an unpotted stack 603 structurally encased in a fiber composite sealed housing 606. In some applications, an unpotted stack 603 may allow for increased outgassing and moisture removal during operation of the battery pack 600 compared to battery pack 500.

In some examples, the sealed housing may be configured to be removable from the stack of batteries. The sealed housing may have two or more sections configured to couple together. The two or more sections may maintain vibration and water resistance of the battery pack when coupled. A battery pack with a removable sealed housing may provide access to the battery cells and/or other interior components (e.g., sensors, cooling loop). This may facilitate repair or replacement of faulty interior components. A removable sealed housing may allow the sealed housing to be fabricated separately from the battery cell stack. For example, forming the sealed housing separately may be desirable if the molding and/or curing temperature of the material of the sealed housing is higher than a storage temperature of the battery cells.

Figure 7:
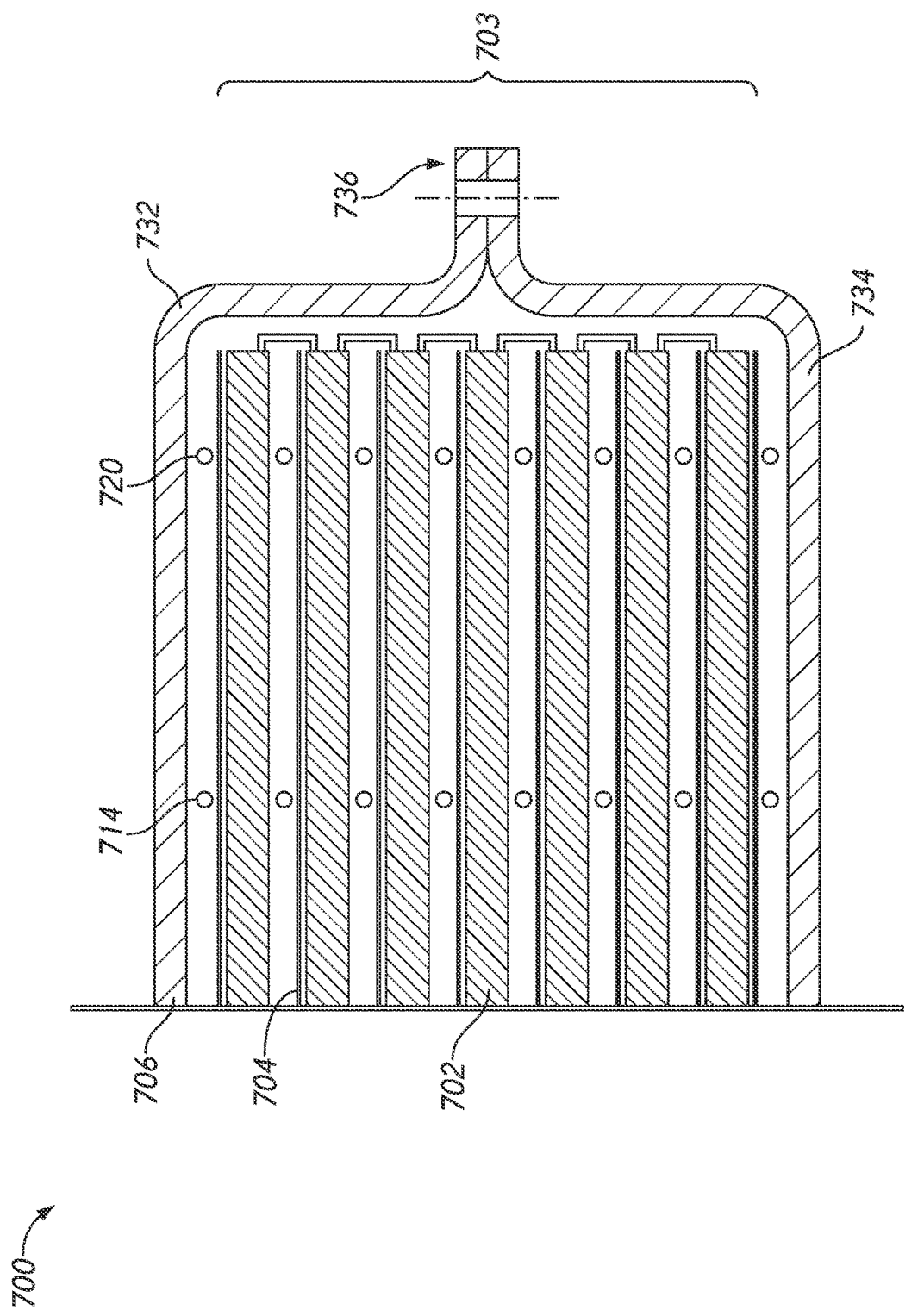
FIG. 7 is an illustration of a portion of a battery pack according to examples of the disclosure.

FIG. 7 is an illustration of a portion of a battery pack 700 in accordance with examples of the present disclosure. Battery pack 700 may include one or more battery cells 702, compliant layers 704, a cooling loop 714, and an outgassing loop 720 in a stack 703. The stack 703 may be enclosed in a sealed housing 706. Battery pack 700 may be a serviceable sealed pack with an unpotted stack 703 in some embodiments.

To form battery pack 700 in some embodiments, the sealed housing 706 may be fabricated using fiber reinforcement in a mold through a VARTM method, similar to the methods described in reference to FIGS. 5 and 6. The net shape of the sealed housing 706 may be sized for placement of the stack 703 within the sealed housing 706. The sealed housing 706 may consists of two sections 732, 734 (e.g., main housing and one endplate) which may be joined together at a flange 736. In some embodiments, the two sections 732, 734 may be bolted together. The sealed housing 706 may or may not include additional seals (e.g., O-ring, caulk). For assembly, the stack 703 may be placed into the sealed housing 706. Connections may be completed for the connectors (e.g., electrical, cooling, sensors, etc.). The two sections 732, 734 may be bolted together at flange 736, securing stack 703 within the sealed housing 706. In some embodiments, the sealed housing 706 may be sized to provide a slight interference with the stack 703, which may provide compression. This preload may help resist the damaging effects of impacts and/or vibration. This fabrication method may produce a battery pack 700 with an unpotted stack 703 which may be removable from the sealed housing 706. This may allow the stack 703 be serviced and/or replaced.

The battery packs 500, 600, and/or 700 may be used to implement an ESS of an all-electric or a hybrid marine propulsion system, such as systems 100 and 200. The battery packs 500, 600, and 700 may allow the ESS to be distributed throughout the vessel's hull by utilizing available space between structural members of the vessel's hull. In some embodiments, the battery packs are integrated into the vessel's hull such that the utilize the space between the structural members of the hull (e.g., hull surfaces or skins and internal braces) with minimal or substantially no use of the cavity or internal volume of the vessel (i.e., interior to the hull to maximize the available space remaining within the vessel's hull for use by other shipboard systems and/or passengers. Also, the battery packs of an ESS according to the present disclosure may be integrated into the hull and distributed throughout the vessel's hull in a manner that does not negatively impact the vessel's center of gravity.

As previously described, battery packs according to the present disclosure may enable a variety of customized electric and hybrid marine propulsion topologies, e.g., as illustrated in the examples in FIGS. 8-23. In accordance with the examples herein, one or more battery packs and/or other components of the ESS may be integrated into the hull of the vessel. For example, one or more of the battery packs of the ESS may be bonded to, laminated onto or otherwise fixedly mounted to the hull, such as to the outer hull, to an inner hull, or both. In some examples, the battery packs may be integrated into the hull by mounting them (fixedly or removably) into a cavity formed between the inner and outer hulls. In some such embodiments, the ESS components integrated into the hull may be structurally integrated therewith, and may not be removable from the hull without compromising the structural integrity of the hull. In some embodiments, they be may be integrated into the hull but may be accessible and/or removable so as to be serviceable or replaceable without compromising the structural integrity of the hull. In one or more of the examples herein, the battery packs or other components of the ESS may be arranged in locations of the marine vessel structure previously unavailable for the placement of electronic components, such as below a water line, in some cases in or proximate the bilge, of the vessel.

A marine vessel according to some embodiments of the present disclosure include a hull, a propulsion system configured to propel the vessel in electric and/or a hybrid-electric mode, and an energy storage system that stores and provides electrical energy for propelling the vessel. The energy storage system includes a plurality of battery packs integrated into the hull. In some embodiments, the propulsion system is a purely electric propulsion system. In other embodiments, the propulsion system is hybrid propulsion system, the watercraft is further equipped with a fuel tank for storing and providing fuel to the propulsion system. In some embodiments, each battery pack includes one or more battery cells, a sealed housing enclosing the one or more battery cells, and at least one compliant layer between the housing and the one or more battery cells, the compliant layer being configured to reduce vibrations transmitted from the hull to the one or more battery cells. The battery packs may be implemented according to any of the examples (e.g., battery packs 300, 400, 500, 600, 700, and 1500) of the present disclosure.

Each battery cell may include first and second opposite surfaces, with the compliant layer positioned adjacent to one or the two surfaces. The compliant layer may be positioned so that it is against, in contact with at least a portion of the adjacent surface of the battery cell. In some embodiments, the compliant layer may be substantially co-extensive with the surface of the battery cell adjacent thereto. The battery cells are electrically coupled internal to the housing. That is, the positive terminals of the battery cells of a given battery pack are electrically coupled to one another and negative terminals of the battery cells are also electrically coupled to one another within the housing of the battery pack. In some embodiments, the sealed housing includes a positive lug flange electrically coupled to a positive terminal of the one or more battery cells and a negative lug flange electrically coupled to a negative terminal of the one or more battery cells. In some embodiments, the battery cells of a battery pack may be enclosed in a vacuum bag and at least one compliant layer may be positioned between the vacuum bag and the sealed housing.

In some embodiments, the individual battery packs are cooled by an immersion cooling system which includes a dielectric fluid provided within the housing of the individual battery packs. The dielectric fluid may be provided in direct contact with the one or more battery cells of the individual battery pack. In some embodiments, the dielectric fluid is fluidly coupled to an external cooling loop external and circulated into and out of the housing of the individual battery pack(s), e.g., by a pump that may be part of the external cooling loop. In some embodiments, a single external cooling loop circulates and cools the dielectric fluid or multiple battery packs. The external cooling loop may optionally include a heat-exchanger (e.g., a liquid-to-liquid) heat exchanger that transfers heat from the dielectric fluid exiting the battery pack housing to a second working fluid before the cooled dielectric fluid is returned to the battery pack housing.

As described herein, the battery packs may be integrated into the hull of the vessel in a variety of ways. Generally, the hull of a vessel, as illustrated in the examples that follow, includes an outer hull, at least a portion of which is in contact with the water when the vessel is operated on the water. The outer hull has an outer surface, which contacts the water, and an inner surface, which generally faces inward towards the internal volume or cavity of the vessel. The hull of the vessel also includes longitudinal and transverse structural members, which may be referred to as internal braces, frame members or girders. Internal braces are used to structurally reinforce the outer hull (e.g., to enable it to withstand hydrostatic and hydrodynamic loads and other service loads). Internal braces are attached to the outer hull and extend therefrom inward toward the vessel's interior, forming the internal frame of the hull. In some cases, the hull may also include an inner hull, which may extend or span over the free ends of the internal braces, substantially enclosing the internal frame and the hull cavity defined between the inner and outer hulls. In embodiments, the vessel's inner hull may be a partial inner hull, enclosing only a portion of the internal frame of the hull. In some embodiments, one or more stiffeners that may be shorter in height than other frame members (e.g., the longitudinal beams) may be attached to the inner surface of the outer hull or to either side of the outer hull for added structural reinforcement of the hull. The vessel's hull is, thus, segmented into a plurality of hull cavity portions or bays, whether or not enclosed or covered by an inner hull. In accordance with the examples herein, the battery packs of the ESS may be integrated into the hull by distributing them throughout the hull cavity portions of the hull. In some embodiments, the battery packs are substantially fully contained within the hull cavity and thus take up no or minimal volume that may be otherwise usable by other ship systems or cargo.

Figure 25:
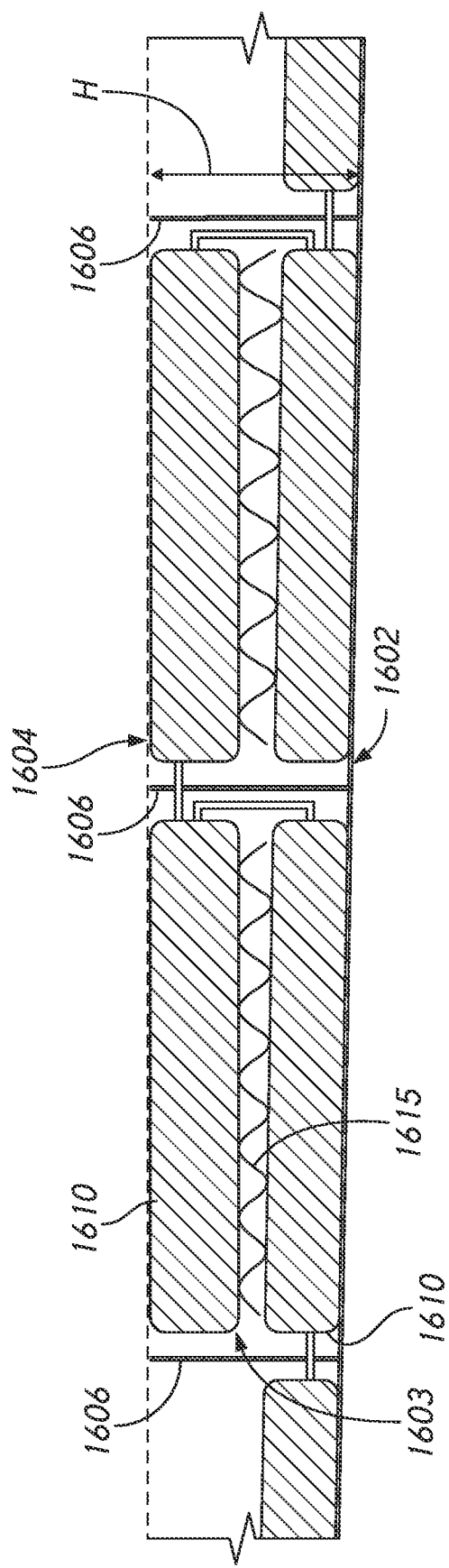
FIG. 25 shows a partial cross section of an arrangement of battery packs integrated into the hull of a vessel according to the present disclosure.

In some embodiments a single battery pack is placed in a given hull cavity portion, the battery packaging technologies described herein permitting great customization as to shape and size of the individual battery packs. In some embodiments, multiple battery packs may be placed in a single hull cavity portion (e.g., as shown in FIG. 25). In some embodiments, the battery pack(s) may substantially fill the space or bays defined between adjacent braces, for example spanning 60% of more of the distance between two braces, while allowing for mounting/dampening structures to be accommodated in a given bay. In some embodiments, the battery pack may fill substantially all (e.g., 90% or greater) of the available space between the internal braces defining a given bay. In some examples, multiple packs may be placed between two adjacent braces to fill substantially all of the available space. In some such embodiments, the battery pack may be placed side by side to substantially fill the span of a bay and/or they may be optionally stacked to substantially fill the vertical space of a bay. The vertical space of a bay may be defined by the height of the internal braces defining that bay. Battery packs placed in the same and/or adjacent hull cavity portions are electrically connected via electrical conductors which may pass through penetrations in the internal braces. For example, when connected in series, the positive external terminal (e.g., positive lug flange) of one battery pack may be connected to the negative external terminal (e.g., negative lug flange) of a battery pack in an adjacent bay by a conductor that passes through the frame member separating the two bays. Or, when connected in parallel, the positive external terminals of two or more adjacent battery packs may be connected to one another and the negative external terminals of the two or more adjacent battery packs may be connected to one another via electric conductors, some of which may pass through internal braces of the hull. As such, a significant portion of the wiring of the ESS may be contained within the hull cavity. Of course, it is also contemplated that battery packs may be electrically connected to other battery packs and/or other components of the ESS externally to the hull cavity.

Individual battery packs, and in some cases sets (e.g., two or more) of battery packs located in a single bay, may be integrated into the hull, removably or irremovably, in accordance with any of the various examples of the present disclosure. In some examples, a battery pack may be integrated into the structure of the outer hull or the inner hull, meaning that the battery pack is irremovably attached or mounted thereto. The term irremovably attached or mounted implies that the battery pack is mounted in a manner not intended for removal of the battery pack, in that the battery pack may not be removable from the specified hull structure without damage to or compromising the structural integrity of the specified hull structure. For example, a battery pack may be integrated (or integrally formed) into the outer hull by laminating it into the inner surface of the outer hull. The battery pack may be laminated thereto by bonding it or otherwise attaching (e.g., via a resin) and/or use of one or more additional layers or plies of composite material, in the case of laminated composite hull construction. Other lamination techniques may be used. Once so attached, the battery pack becomes an integral part of the outer hull's structure. Similarly, the battery pack may be integrated into the structure of the inner hull by irremovably attaching it thereto, either to the inner or outer surface thereof. In other embodiments, battery pack(s) may be removably integrated into the hull. For example, the battery packs may be removably mounted to the outer hull, the inner hull (if present), or both, by any suitable mounts (e.g., angle brackets, clips, etc.). In some embodiments, the battery packs may be mounted by substantially immobilizing, other than optionally damping vibrations, using opposing resilient members or other suitable compliant structures. In some embodiments, the battery pack may be positioned between the inner and outer hull and coupled to either or both of the hulls and/or to the internal braces segmenting the hull cavity into hull cavity portions. Optionally, the mounts may be equipped with vibration damping features, or additional separate vibration damping structures may be provided between the housing of the battery pack(s) and the hull and/or between adjacent battery packs to reduce the transmission of vibrations to the interior of any given battery pack. In some examples compliant or resilient material(s) or other vibration damping structures may be provided between the housing of the battery pack and the hull, or adjacent battery pack housing(s) in some instances in which multiple battery packs share the same hull cavity portion.

Figure 8:
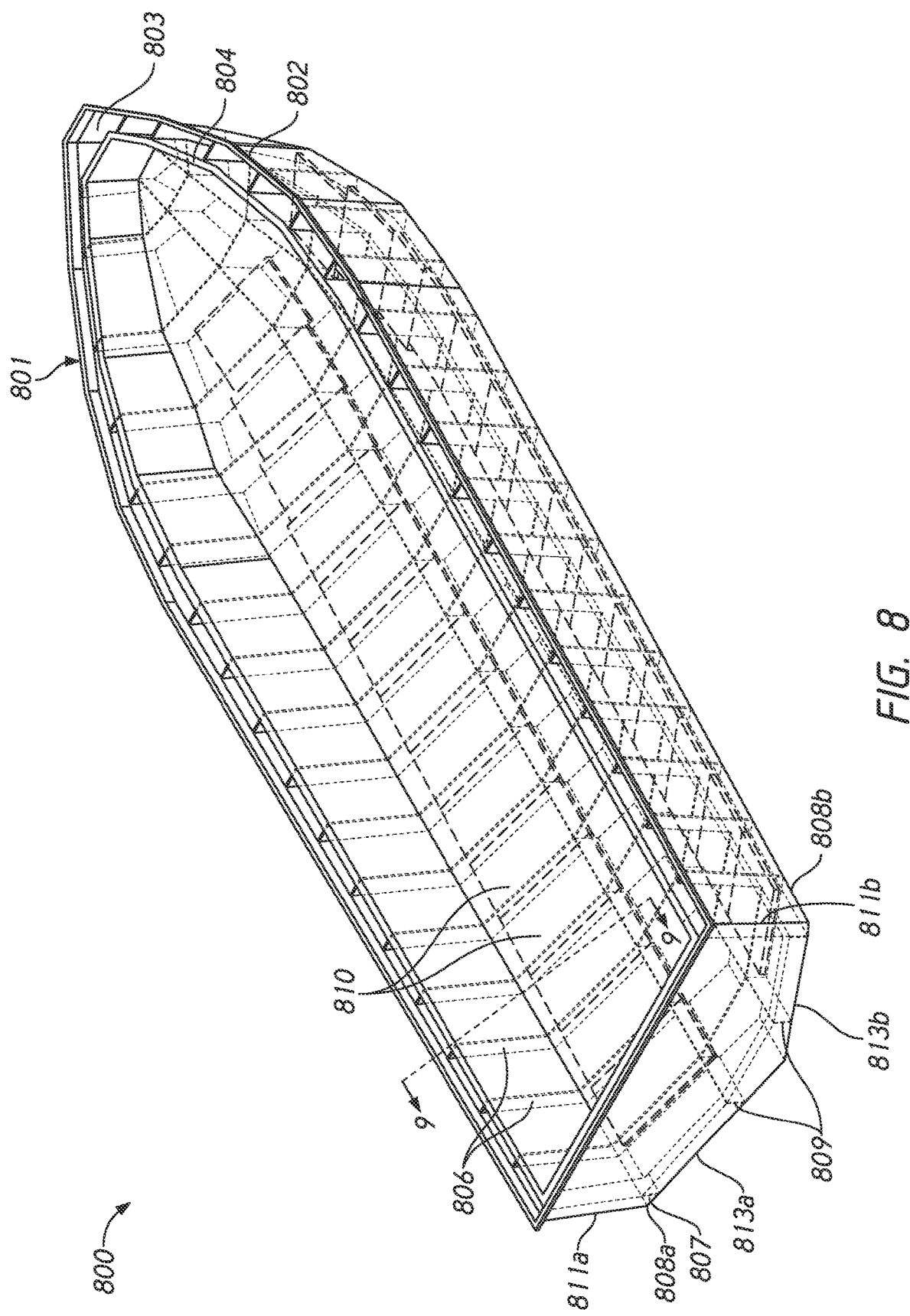
FIG. 8 is an illustration of a marine vessel with a hard-chine planning craft hull design according to examples of the disclosure.
Figure 9:
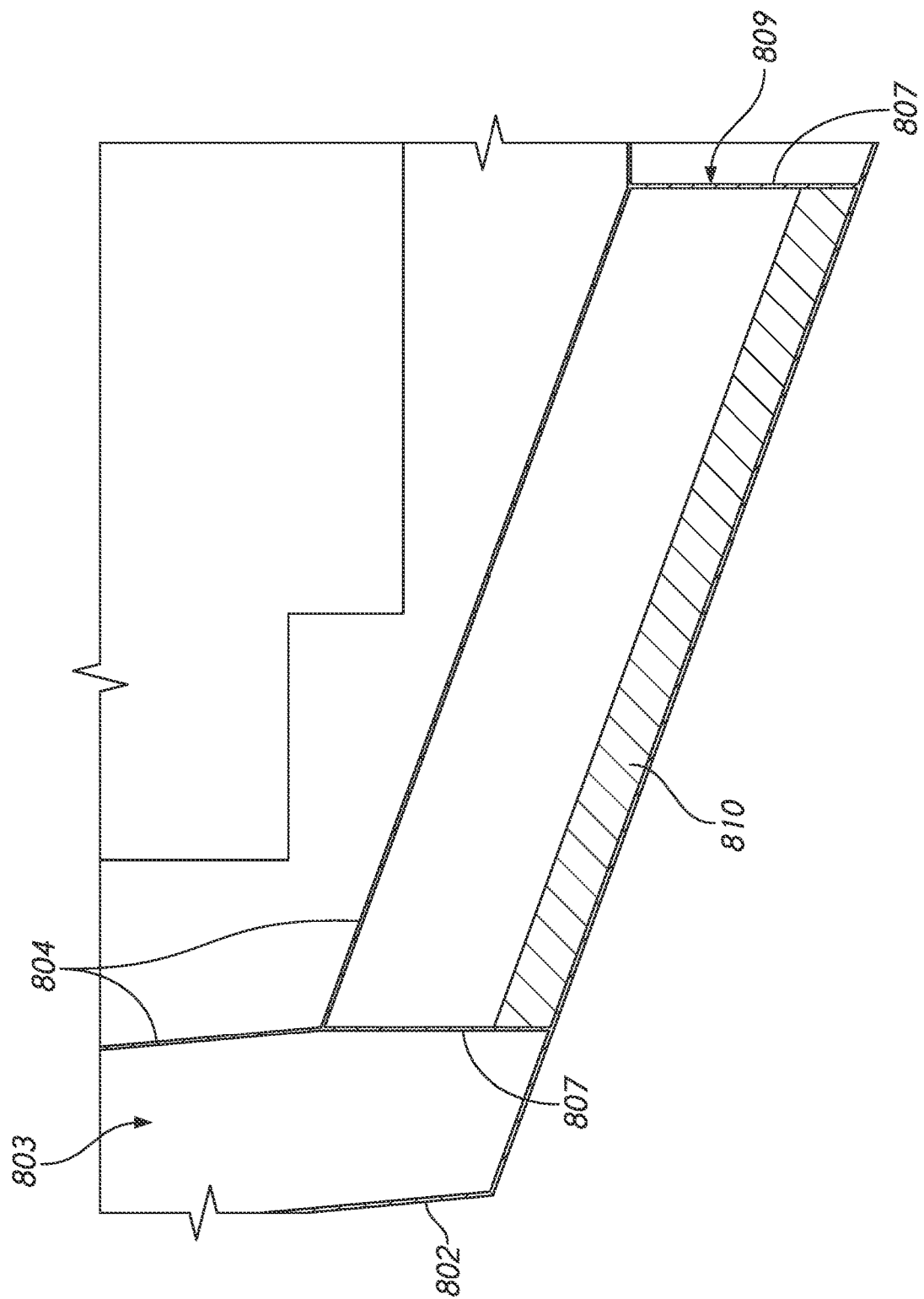
FIG. 9 is a cross-sectional view of a portion of the marine vessel according to examples of the disclosure.
Figure 10:
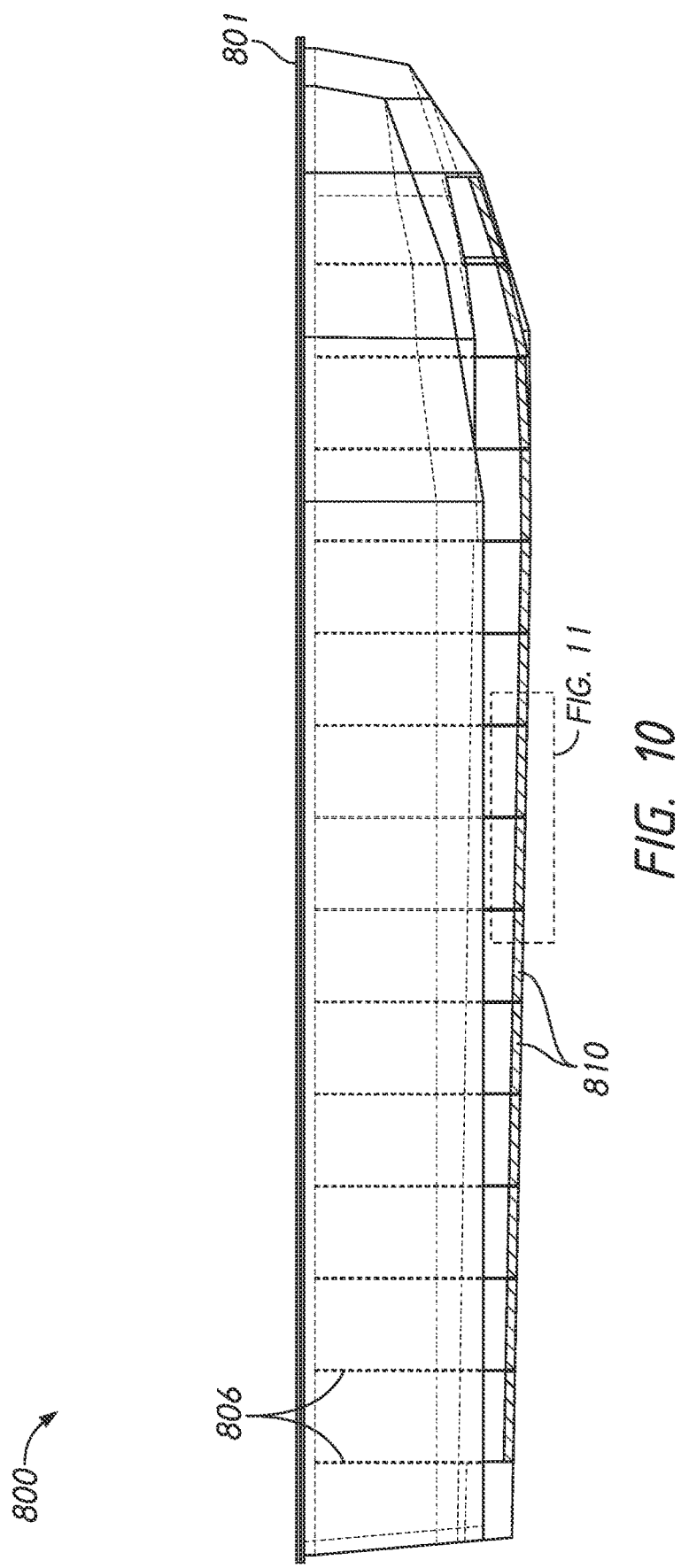
FIG. 10 is an illustration of a marine vessel with a hard-chine planning craft hull design according to examples of the disclosure.
Figure 11:
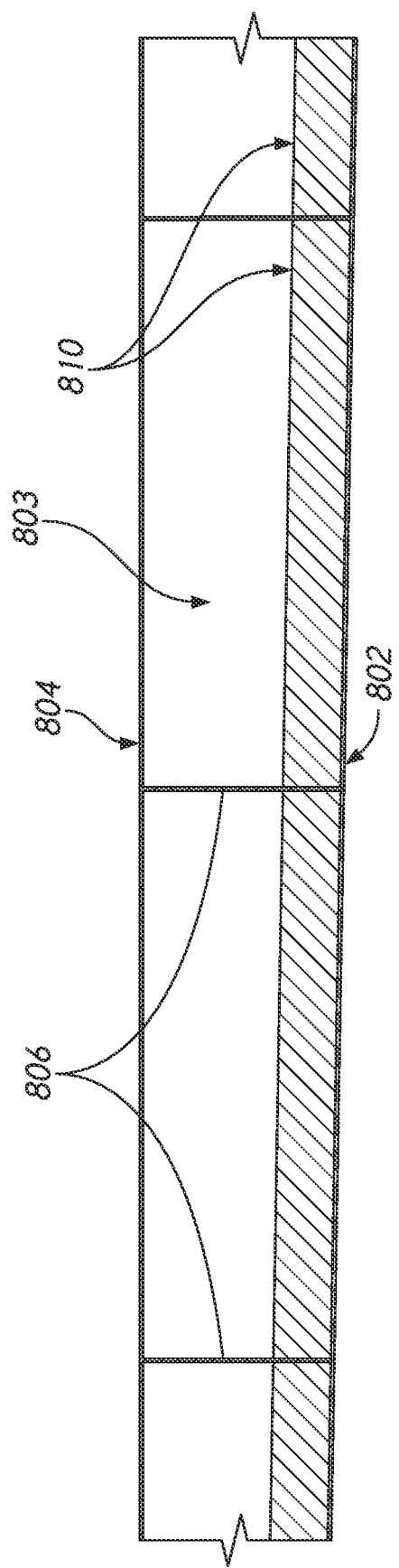
FIG. 11 is an illustration of a portion of the marine vessel according to examples of the disclosure.

FIGS. 8-11 illustrate an example arrangement of ESS components according to the present disclosure. FIG. 8 shows a simplified isometric view of the hull 801 of a marine vessel 800. In the example in FIG. 8, the hull has a hard-chine planning craft hull design, however in other embodiments, the vessel may have a different hull form, e.g., round, arched, flat, deeper or shallower v-hull design with either constant or variable deadrise and either flat or curved bottom surfaces, a multi-hull (e.g., catamaran, trimaran) design or other. The vessel 800 includes a propulsion system (e.g., system 100 or 200) not shown in this simplified view so as not to obscure other elements of the arrangement. The propulsion system may be configured to propel the vessel in electric and/or hybrid-electric mode. An energy storage system (ESS), which includes one or more battery packs 810 according to any of the examples herein, provides electrical energy for the propulsion system of vessel 800. The battery pack(s) 810 are integrated into the hull 801 of the vessel 800, in this example in hull cavity portions located below the chine. FIG. 9 is a simplified transverse cross-sectional view of a portion of the hull 801 of the marine vessel 800 taken at line 9-9 in FIG. 8. FIG. 10 is a simplified cut-away side view of the marine vessel 800 and FIG. 11 is an enlarged view of a portion of the hull 801 of the marine vessel 800 indicated by line 11-11 in FIG. 10.

In accordance with some embodiments, the marine vessel 800 includes an outer hull 802. The outer hull 802 defines the outer surface of the vessel's hull 801, which comes into contact with water when the vessel 800 is operated on the water and the design of which dictates the hull drag experienced by the vessel 800. In some embodiments, the marine vessel 800 may include both an outer hull 802 and inner hull 804, the inner hull 804 defining an inner surface of the vessel 800. The inner hull 804 may enclose, at least in part, the internal frame of the hull 801. The inner surface of the inner hull 804 defines an interior volume or cavity of the vessel 800, within which other vessel structures (e.g., bulkheads, beams, decks, etc.), shipboard systems, cargo, fuel, etc. may be accommodated on the vessel 800. The inner and outer hulls 804, 802, respectively, are spaced apart and define a hull cavity 803 therebetween. The inner and outer hulls 804, 802 are joined by one or more structural members, such as one or more transverse braces 806, also be referred to as ribs 806, which run substantially transversely to the length of the vessel 800. The inner and outer hulls 804, 802 are also joined by one or more longitudinal braces 807, also referred to as stringers or beams 807, which run substantially longitudinally (i.e., along the length) of the vessel 800. The longitudinal braces 807 may include one or a plurality of keel beams 809, in this example a pair of keep beams 809 located at the bilge. The one or more keel beams 809 may extend substantially the full length of the hull 801, form the bow to the stern of the vessel 800. Other beams may run substantially the full length of the hull (from stem to bow) or partially along the length of the hull, such as along a portion of the bottom of the vessel. Not shown, the vessel 800 may include other structure(s) such as transverse bulkheads, which extend across vessel's cavity (e.g., between the outboard sides of the hull 801), a weather deck, etc. The weather deck and bulkheads may provide one or more dry areas, which are substantially protected from the elements, within the interior volume of the vessel 800. In the example in FIG. 8, the sidewall portions 811*a,b* of the hull meet the bottom portions 813*a,b* of the hull at respective left and right chines 808*a,b*, with the waterline of the vessel, in certain operating conditions such as when the vessel 800 is not planning but is instead operating in displacement mode, being above the chine line along the hull's sidewalls.

As illustrated in FIG. 8, one or more battery packs 810 may be integrated into the vessel's hull 801, such as within the hull cavity 803, and in this example adjacent to the outer hull 802. FIG. 8 illustrates an example in which a plurality of battery packs 810 are integrated into s substantial portion of the length of the hull 800, such as along 70% or more of the length, and in some cases 80% or more of the hull's length. In other embodiments, battery pack(s) 810 may be integrated into a smaller portion of the hull's length, such that the battery packs 810 extend only along 50% or less of the length of the hull 801. In some embodiments, battery pack(s) are placed in each bay along a longitudinal portion of the hull into which battery packs are integrated. In other embodiments, bays may be omitted along a longitudinal portion, leaving some bays without a battery pack therein. In some embodiments, a longitudinal portion may include multiple bays across (e.g., in the transverse direction), and battery packs may be placed in each bay (longitudinally and/or transversely) or interspersed such that some bays do not include a battery pack. Such bays may be left empty, used for a different function (e.g., ballast), or may accommodate other components of the ESS (e.g., wiring bundles, connectors and/or associated wiring harnesses, or others). In this example and other examples herein, one or more of the battery packs are integrated into the hull at a location which is below the waterline of the vessel, at least in some operating modes (e.g., when the vessel is operating in displacement mode). In other embodiments and for other hull designs, the vessel may not be operating in additional modes and battery packs may be integrated into the hull such that they are below waterline substantially all the time when the vessel is operated on the water. In some embodiments, battery packs may be located anywhere along the bottom side of the hull, such as anywhere between the bottom longitudinal braces closes to the outboard sides of the hull, and in some cases in the bilge of the vessel (see e.g., FIG. 20).

In some embodiments, the sides of the battery packs adjacent to the hull, in this case adjacent to the outer hull, may conform to the adjacent surface of the hull 801. By shaping the battery packs to fit conformally against one or more surfaces of the hull or other structure may enable more optimal use of the available space (e.g., optimizing the use of the hull cavity) for accommodating energy storage components. In FIG. 8, individual ones of the battery packs 810 are sized to fit, and substantially fill the space, between the transverse internal braces 806 as shown also in FIGS. 10 and 11, the distance between which may vary from stem to bow. Since custom size and shape battery packs can be constructed in accordance with the principles herein, the individual battery packs 810 may be sized to utilized as much of the available space in the hull cavity as may practical in a given application. In FIG. 8, the individual battery packs 810 are sized to also fit, and substantially fill the space, between the longitudinal internal braces 807, as can be seen also in FIG. 9.

One or more of the battery packs 810 may be integrated with the outer hull 802. The battery packs 810 may be formed to a desired shape and size for integrating into the hull. In some embodiments when battery packs 810 are integrated with the outer hull, the battery packs may be placed against such that they are conformal to the inner surface of the hull 802. The battery packs may be formed to this custom shape or, if flexible, may be laid against the surface of the outer hull such that they lay conformally there against as they are fixedly mounted to the hull. In some embodiments, the battery packs may be integrated into the outer hull 802 during hull fabrication. The shapes of the battery packs 810 may be custom formed for each bay, based, at least in part, on a desired outer profile of the hull 801, also referred to as the hull form. In some embodiments, the battery packs 810 may be structural elements of the hull, for example of the outer hull 802. Depending on the matter of fixedly attaching thereto, the integration of the battery packs 810 into the outer hull 802 may provide structural stiffness and/or strength to the outer hull 802. In other embodiments, the battery packs may be fixed to but otherwise coupled in a manner that eliminates or reduces any load transfer to the battery pack(s).

The hull 801 may be fabricated using any suitable currently-known or later developed manufacturing method. For example, outer hull 802 and internal braces (e.g., transverse braces 806) may be fabricated using methods such as resin impregnation techniques (e.g., VARTM), prepreg layups, or combinations of these. The outer hull 802 and/or internal braces may include fiberglass, carbon fiber, and/or other composite materials (e.g., metal fiber composites), or metals. The battery packs 810 may be fully fabricated, e.g., as described with reference to FIGS. 5 and 6, and arranged along the inner surface of the outer hull 802. The battery packs 810 may be integrated with the outer hull 802 by using heat cured prepreg materials and/or potted into place using VARTM. In some embodiments, a portion of a battery pack, such as only the stack of battery cell(s) and compliant layer(s) (e.g., stack 503, stack 603) may be fabricated and distributed along an inner surface of the outer hull 802 and then laminated to the hull 802, the lamination providing a sealed housing for the battery pack. In some embodiments, the stack of battery cell(s) and compliant layer(s) may be vacuum bagged (e.g., vacuum bag 630). A separate sealed housing may be omitted as a sealed housing for the battery pack 810 may be provided by the integration of the battery pack into the hull, e.g., using the techniques described above. The sealed housing is thus formed in place on the outer hull 802. Appropriate connections may be made to the battery packs 810 (e.g., electrical coupling to a DC bus and/or DC/DC controller, coupling cooling system to a pump, etc.) before or after integration of the battery pack with the outer hull 802. In some embodiments, additional vibration isolation layers (e.g., foam sheets, foam blocks, polymer fills) may be added prior to or part of the integrating of the battery pack 810 with the outer hull 802.

As shown in FIGS. 8-11, battery packs 810 may be positioned below the first chine angle 808 in the outer hull 802. This location may minimize the impact to the ship's vertical center of gravity. However, the battery packs 810 could be integrated in other hull locations. For example, the battery packs 810 could be integrated with the outer hull 802 above the chine angle 808, the inner hull 804, or a deck of the vessel 800. In some embodiments, battery packs 810 may be integrated at various locations of the vessel's hull 801. Integration of the battery packs 810 into the vessel's hull 801 (e.g., into the structure of the inner hull, outer hull, or within the space therebetween) may reduce the amount of other internal volume of the vessel occupied by the ESS that may otherwise be used by other shipboard systems. In some embodiments, integrating the battery packs 810 into the structure of the inner or outer hull may sufficiently stiffen or strengthen the battery packs and obviate the need for external supporting structures (e.g., battery racks), thereby reducing the overall weight of the ESS and thus the additional weight it adds to the vessel 800.

Figure 12:
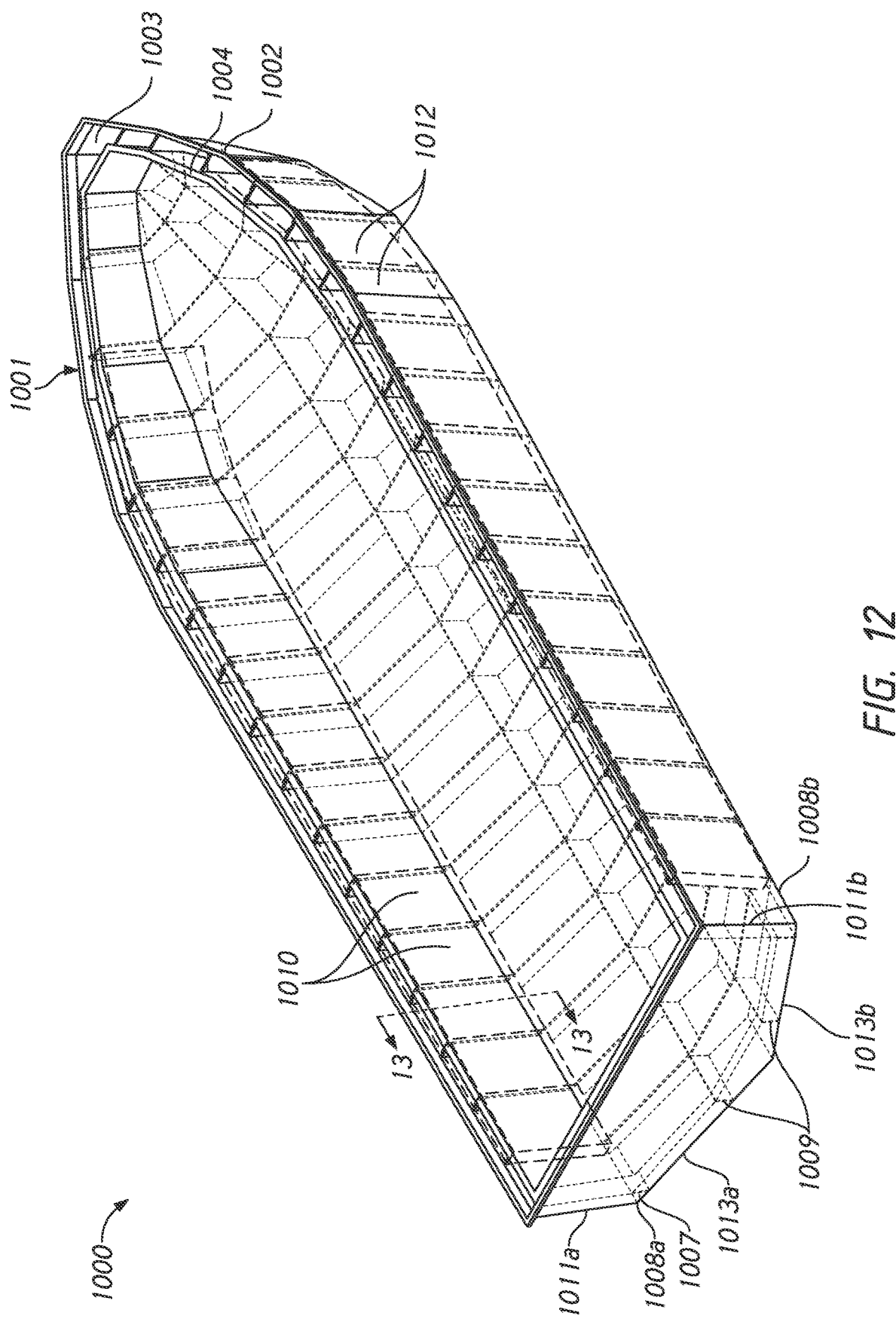
FIG. 12 is an illustration of a marine vessel with a hard-chine planning craft hull design according to examples of the disclosure.
Figure 13:
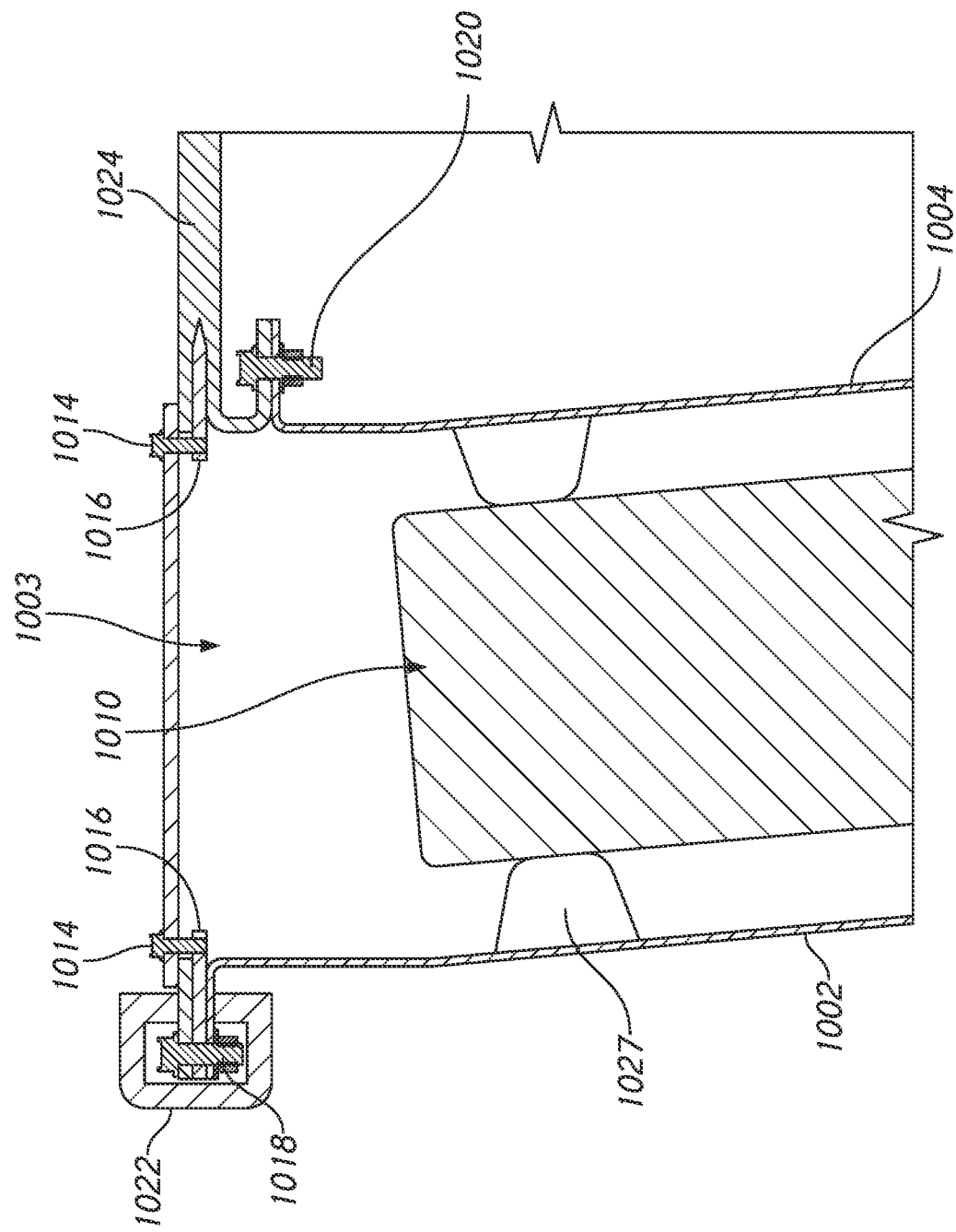
FIG. 13 is an illustration of a portion of the marine vessel according to examples of the disclosure.
Figure 14:
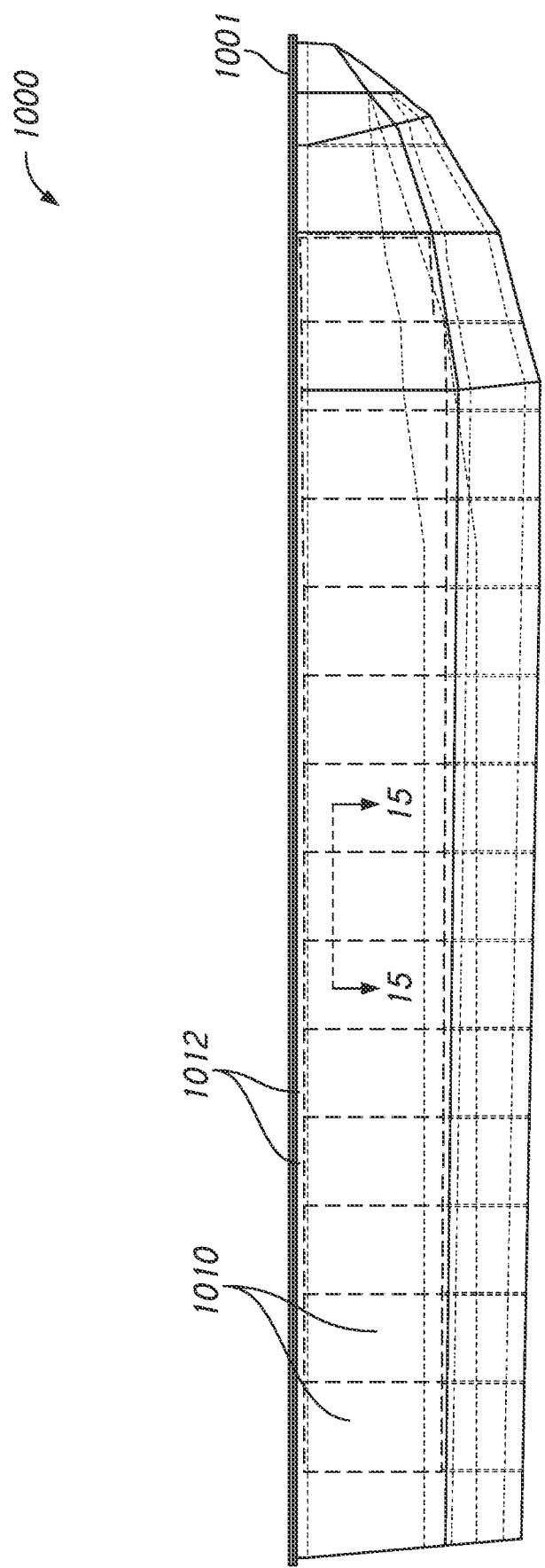
FIG. 14 is an illustration of a marine vessel with a Hard-chine planning craft hull design according to examples of the disclosure.
Figure 15:
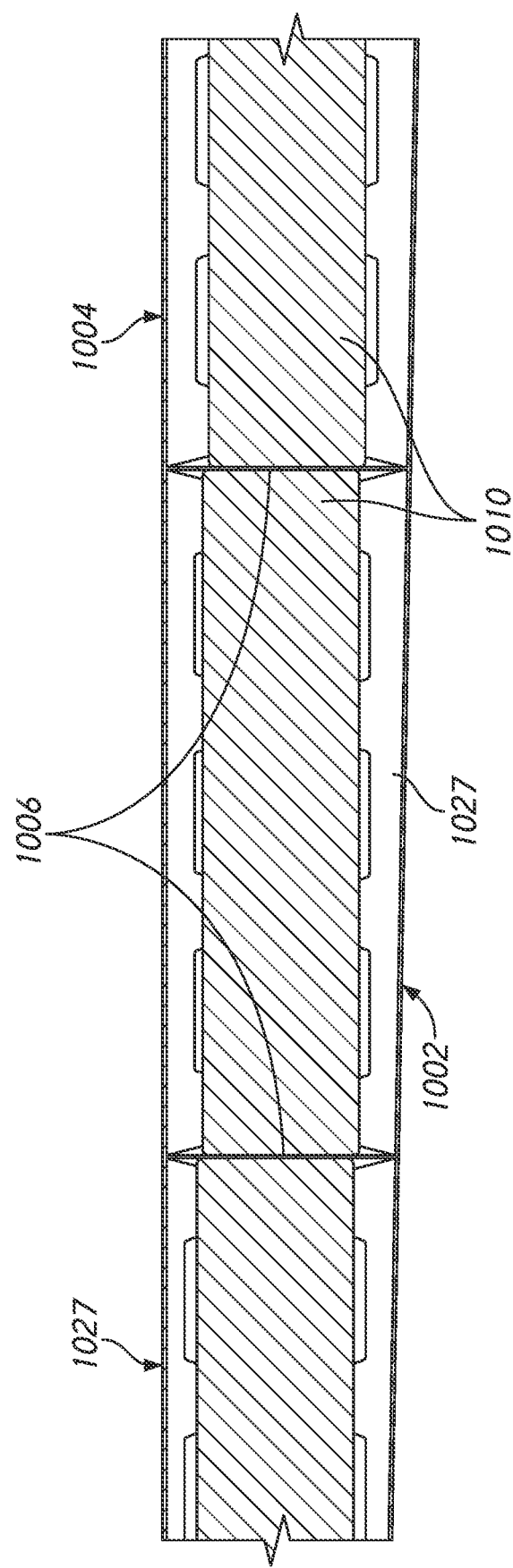
FIG. 15 an illustration of a portion of the marine vessel according to examples of the disclosure.

FIGS. 12-15 illustrate an arrangement of ESS components according to further examples of the present disclosure. Similar to FIG. 8, FIG. 12 shows a marine vessel 1000 with a hard-chine planing craft hull design, however in other embodiments, the vessel 1000 may have a different hull from. FIG. 13 a portion of a cross-sectional view of the hull 1001 of the vessel 1000, taken at line 13-13 in FIG. 12. FIG. 14 is a side elevation view of marine vessel 1000 and FIG. 15 is a longitudinal cross-sectional illustration of a portion of the hull 1001 taken at line 15-15 in FIG. 14. In this example, the marine vessel 1000 includes an outer hull 1002, which has an outer surface defining the outer surface of the hull that is in contact with the water during operation of the vessel, and the design of which dictates the hull drag experienced by the vessel. In some embodiments, as shown in FIGS. 12-15, the marine vessel may include both an outer hull 1002 and inner hull 1004, the inner hull defining an inner surface of the vessel. The inner surface may define an interior volume of the vessel 1000, within which other vessel structures (e.g., bulkheads, beams, decks, etc.), shipboard systems, cargo, fuel, personnel, etc. may be accommodated on the vessel 1000. The inner and outer hulls 1004, 1002, respectively, may be spaced apart defining a hull cavity 1003. In some embodiments, the inner hull 1004 may not enclose all portions of the hull cavity 1003. For example, one or more hull cavity portions along the sides (or outboard portions) of the hull and/or the bottom portion of the hull may not be enclosed by an inner hull segment and may remain open to the interior of the vessel. The inner and outer hulls 1004, 1002 are joined by some or all of the transverse braces 1006 and lateral braces 1007 that form the internal frame of the hull 1001. In FIG. 12 (and also in FIGS. 8, 16, and 20) a cap that encloses the sheer edges of the inner and outer hulls, thereby enclosing the hull cavity 1003, has been removed to show the internal structure. One or more longitudinal braces or beams 1009 may be located at the bilge, extending form stern to bow. Other longitudinal braces or beams 107 may be spaced laterally from the beams 1009 and may run the full length of the vessel (from stern to bow) or partially along the length of the vessel, such as along a portion of the bottom or sides of the vessel's hull 1001. The sidewall portions 1011a,b of the hull meet the bottom portions 1013a,b of the hull at respective left and right chines 1008a,b, with the waterline of the vessel, in certain operating conditions, being above the chine line along the hull's sidewalls. In other embodiments, the hull 1001 may have a different hull form, such as a hull design where the bottom portion of the hull smoothly transitions to the outboard sides, without a hard chine. In some examples, the hull cavity 1003 may be divided or partially divided into multiple hull cavity portions or bays 1012 by the transverse braces 1006, the longitudinal braces 1007 and 1009, or other structural members of the hull frame. Some of these hull cavity portions or bays 1012 may be located so as to remain substantially dry during normal operation. Others may be located such that at times they may be filled or partially filled with water, and some bays may be specifically configured to be wet bays, for example for use as ballast compartments to selectively vary the ballast of the vessel. As described herein, individual battery packs 1010 may be formed to fit within, and in some cases substantially fill, the individual hull cavity portions 1003. In some cases battery packs may be sized such that multiple battery packs fit within individual ones of the hull cavity portions or bays 1012. In FIG. 10, battery packs 1010 are arranged in hull cavity portions along the outboard sides of the hull 1001. Battery packs may be provided in any desired amount of the cavity portions along the outboard sides of the hull 1001, and optionally along other portions of the hull, as may be appropriate for a particular application (e.g., considering weight, center of gravity, thermal performance, and other constraints). In some embodiments, hull cavity portions 1012 that are occupied by battery packs may be suitably interspersed (e.g., alternated) with hull cavity portions that are not occupied by battery packs, such as to facilitate proper weight balance of the hull. In some embodiments, hull cavity portions 1012 on one outboard side may be mirrored to bays occupied on the opposite outboard side to reduce imbalance, or the selection of bays to be occupied on either of the outboard sides may be done to compensate for or balance out weight at other locations of the vessel. As previously noted, the battery backs 1010 may occupy substantially the full cavity portion 1012 (e.g., spanning the full space between the internal braces defining a given bay and the full height of the cavity portion 1012. In other examples, some or all of the battery packs 1010 may be sized to occupy only a portion of a respective cavity portion 1012, for example filling less than 70%, 60% or less, or 50% or less of a given hull cavity portion 1012. The battery packs 1010 may be implemented in accordance with any of the examples herein, such as by battery packs 500, 600 and/or 700.

In FIGS. 12-15, at least some of the battery packs 1010 are integrated into the hull after hull fabrication. In some embodiments, a double hull (e.g., outer hull 1002 and inner hull 1004) is fabricated that creates a hull cavity segmented into hull cavity portions or compartments 1012, some of which are located along the outboard sides of the hull, e.g., from the chine line 1008 to the sheer. The compartments 1012 may be defined by the vessel's 1000 outer hull 1002 and inner hull 1004, and the hull's and the internal frame of the that segments the hull cavity 1003 into hull cavity portions. After construction of the hull 1004, battery packs 1010 may be inserted into the compartments 1012 proximate the sheer cap and/or at other locations through access panels in the inner hull. When so inserted, individual battery packs 1010 may be captured in their respective compartment 1012 such that they are spaced from the interior walls of the inner and outer hulls 1004, 1002, respectively. For example, the battery packs 1010 may be captured within the compartment 1012 by mounts 1027 (shown in FIG. 11). The mounts may be configured to substantially immobilized, other than optionally providing vibration damping, a battery pack in a spaced apart position from the interior sides of the inner and outer hulls. The mounts 1027 may be provided by any suitable structure such as angle brackets, clips, or the like. The mounts 1027 may optionally provide vibration damping and may be implemented using any suitable preloaded (e.g., biased toward the pack) and/or resilient structure, which may prevent excessive movement of the battery pack 1010 while reducing vibrations. The mounts 1027 may include, for example, one or more biasing elements (e.g., a spring and/or resilient material such as rubber) that applies a biasing force inward toward the interior of the compartment 1012. The transfer of vibrations from the hull to the battery packs and vice versa may thus be reduced. Coupling the battery packs to the hull in this manner (e.g., via resilient structures), may also reduce the risk of exciting resonance or introducing additional vibration modes that may otherwise detrimentally impact the structural integrity of the hull. In some embodiments, additional vibration damping material(s) may be provided within the compartments 1012 between the interior walls of the hulls and the battery packs. The compartments 1012 may include appropriate connectors for coupling the battery packs 1010 to a power system of the vessel 1000.

As shown in FIG. 11, the sheer cap may be implemented using one or more removable plates 1014 that allow access to the hull cavity portions 1012 proximate to the sheer for installation, servicing and/or removal of the battery pack(s) 1010 in the hull cavity 1003. The top plate(s) 1014 may be removably fastened (e.g., bolted) to one or more fixed plate(s) 1016 extending, at least partially, along the sheer edges of the inner and outer hulls. Respective ones of the fixed plate(s) 106 may be fastened or adhesively jointed to respective ones of the outer hull 1002 and inner hull 1004, e.g., at joints 1018, 1020, respectively. In some embodiments, a rubrail 1022 or other suitable bumper structure may at least partially surround joint 1018 between the outer fixed plate 1016 and the outer hull, particularly in instances when the joint 1018 protrudes beyond the hull form. In some embodiments, the top plate(s) 1014 may be substantially level with a deck 1024 of the vessel 1000. In other embodiments, the deck 1024 may be elevationally below the sheer and top plate(s) 1014. The battery pack 1010 may be fastened to mounts 1027 in some examples (e.g., bolted, clamped) and/or depending on the configuration of the mounts 1027, the battery pack 1010 may be compression fit between opposing mounts 1027 to restrict the movement of, thereby substantially immobilizing, the battery pack 1010. In some examples, the mounts 1027 may include a vibration damping material (e.g., elastic polymer, rubber) to further isolate the battery pack 1010 from vibration. The compartments 1012 may allow the battery packs 1010 to be serviced and/or replaced. As with other examples, adjacent battery packs 1010 may be electrically connected, in series or parallel, with electrical conductor that may pass through the internal braces and/or have portions that penetrate the inner hull, if present.

As shown in FIGS. 12-15, battery packs 1010 may be integrated into the hull at locations that provide for easy removal and servicing. Battery pack integration as shown in FIGS. 12-15 may be used in combination with integration of battery packs at other locations, such as locations vertically lower along the hull for improved weight distribution and/or stability of the vessel 1000.

Figure 16:
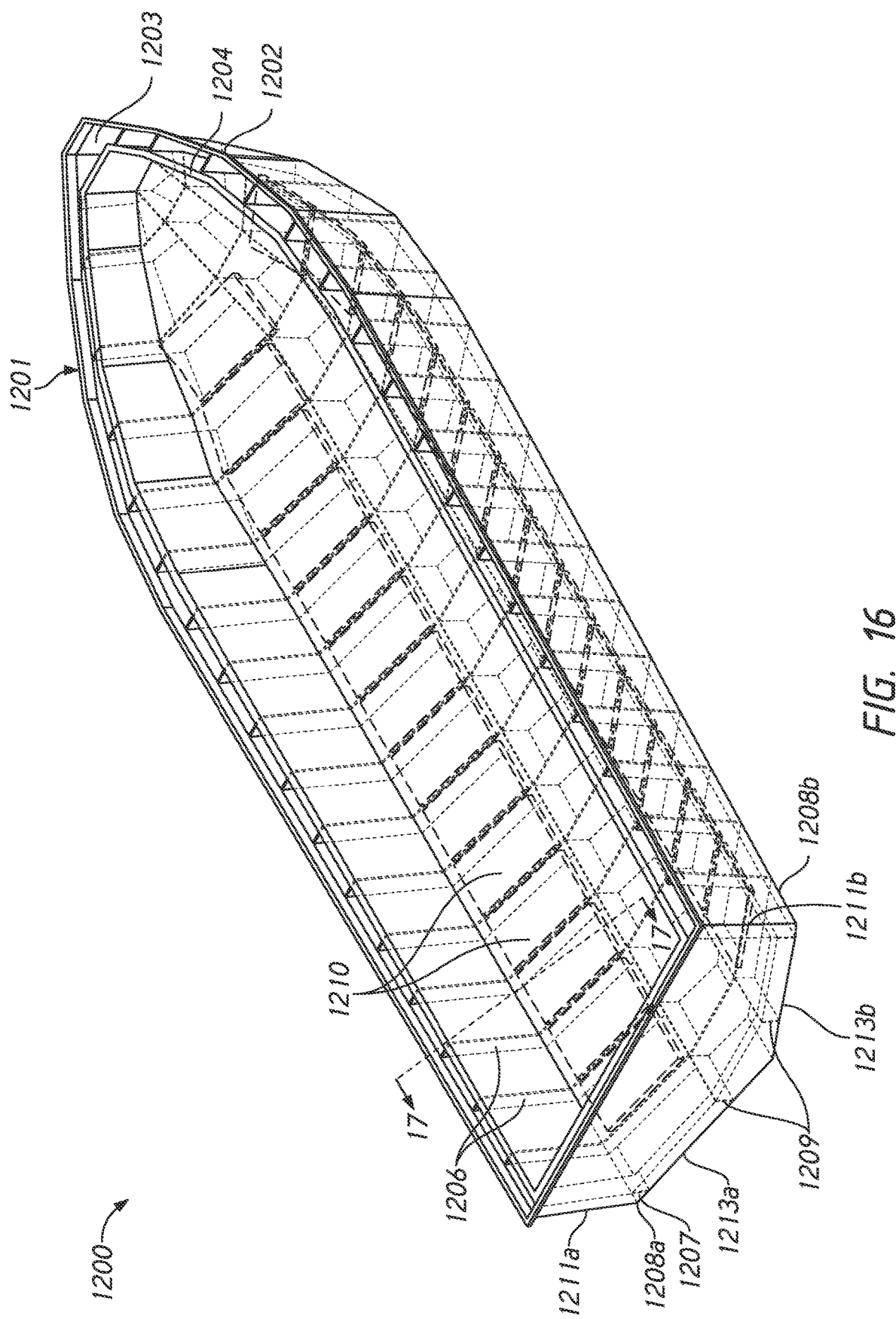
FIG. 16 is a longitudinal cross-sectional illustration of a marine vessel with a hard-chine planning craft hull design according to examples of the disclosure.
Figure 17:
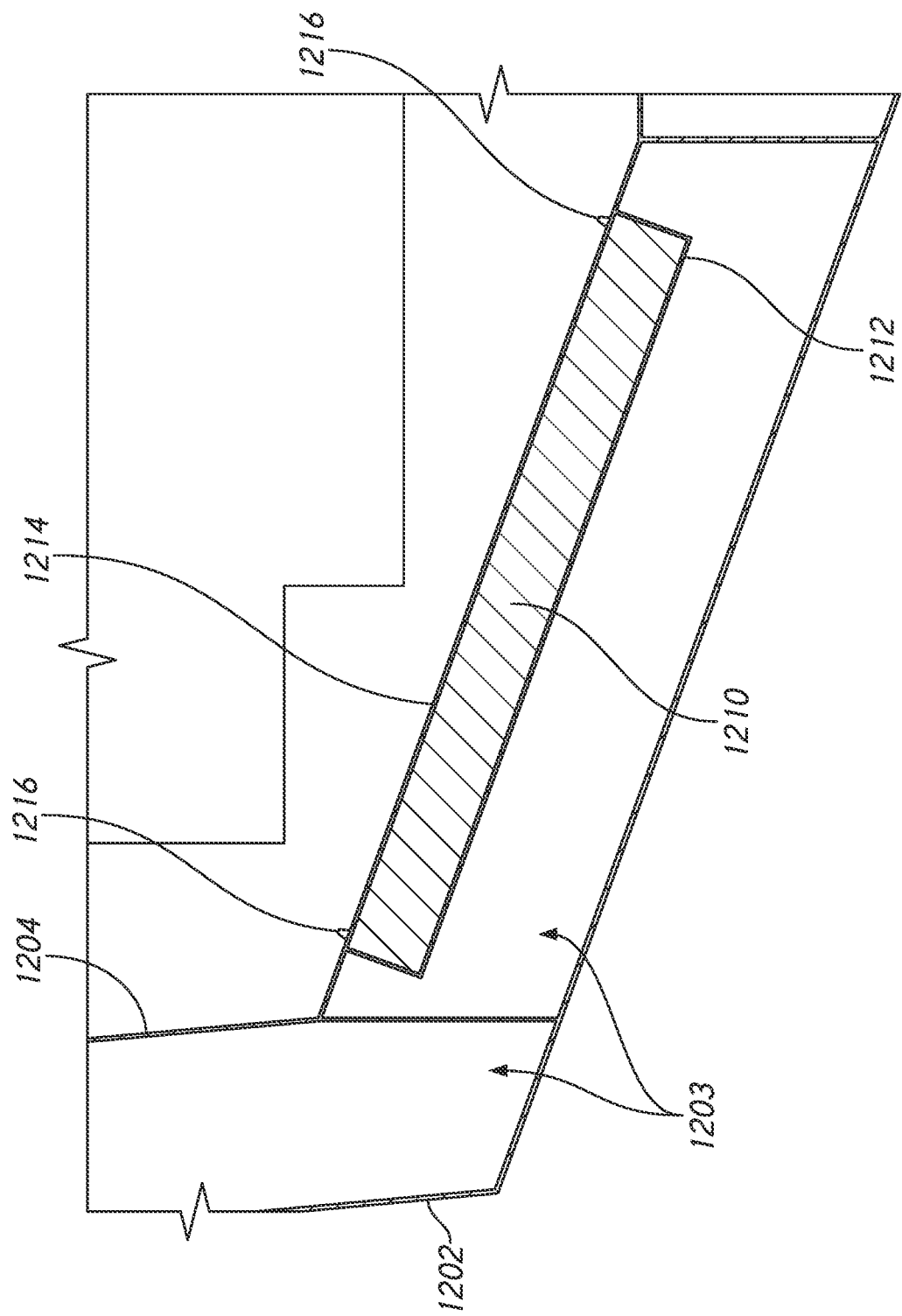
FIG. 17 is a longitudinal cross-sectional illustration of a portion of the marine vessel according to examples of the disclosure.
Figure 18:
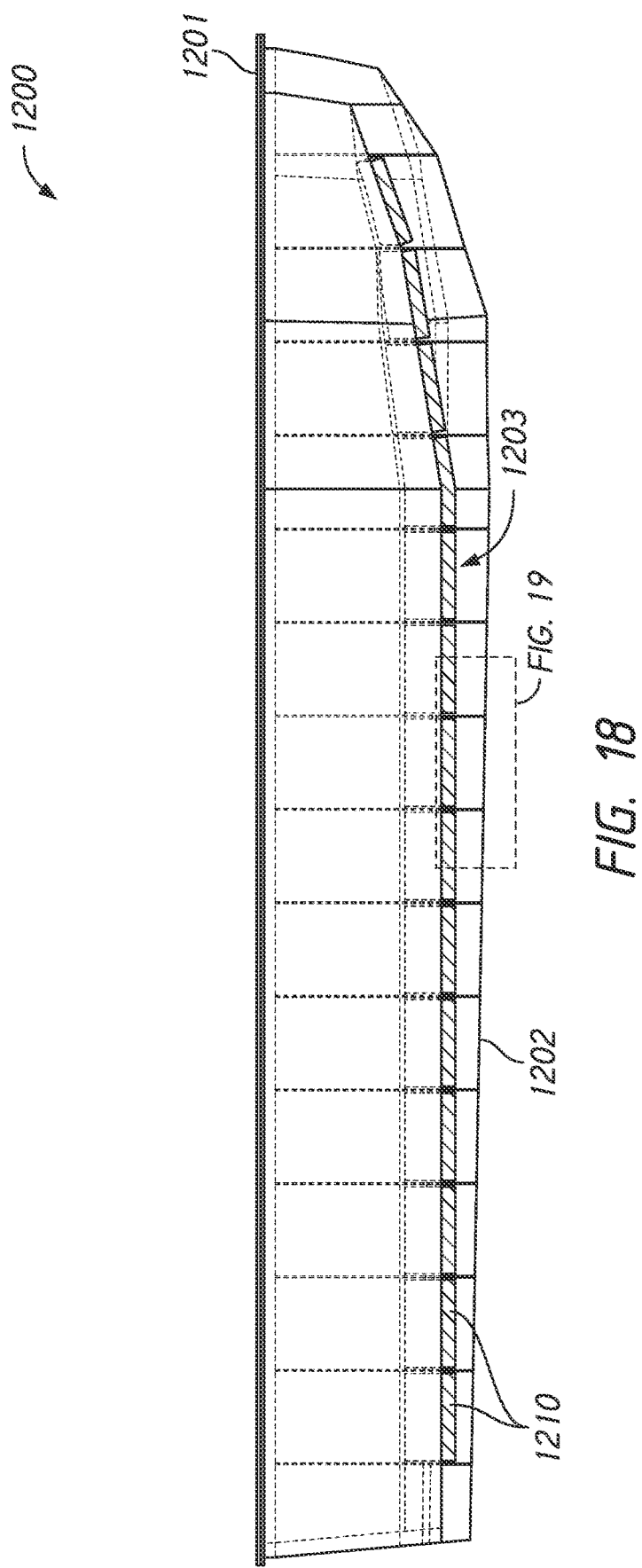
FIG. 18 is a longitudinal cross-sectional illustration of a marine vessel with a hard-chine planning craft hull design according to examples of the disclosure.
Figure 19:
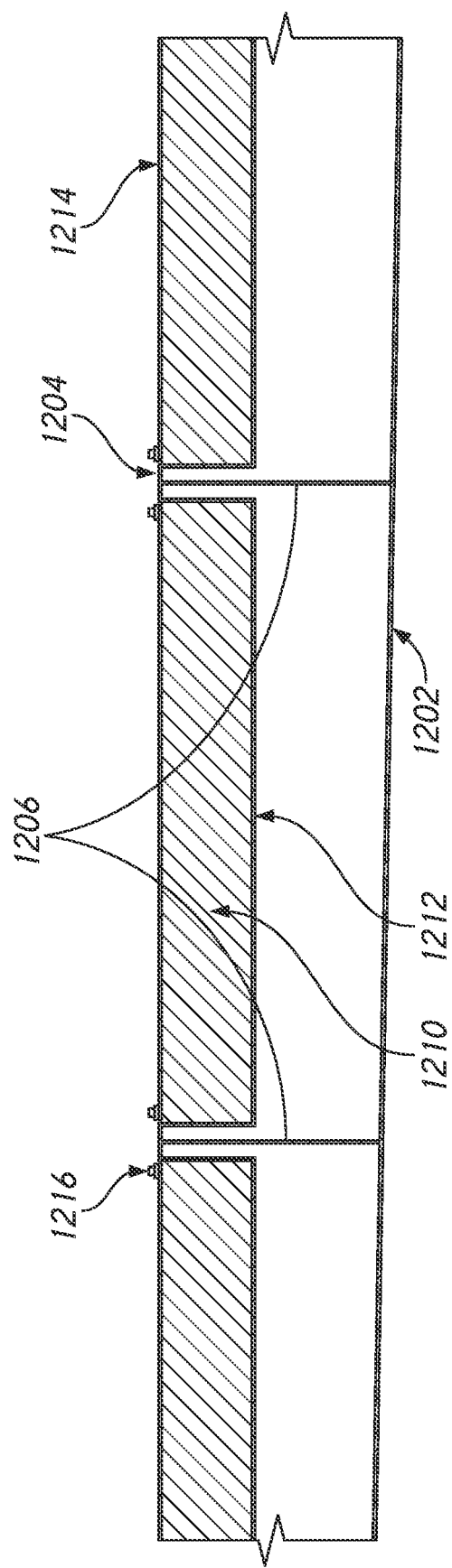
FIG. 19 is a longitudinal cross-sectional illustration of a portion of the marine vessel according to examples of the disclosure.

In some embodiments, one or more of the battery packs may be attached so as to conform to a contour of the outer hull or of the inner hull. For example, if the hull has a curved outer profile and a battery pack is integrated into a portion of the hull that is curved, the battery pack may also have at least one side, the side placed against the hull, which is curved and follows the contour of the hull. In some embodiments, the battery pack(s) may be placed against a surface of the inner hull, for example against the interior or underside of the inner hull, as shown in FIGS. 16-19. FIGS. 16-19 illustrate further examples of battery packs integrated into the hull of a vessel according to the present disclosure. FIG. 16 is an illustration of a marine vessel 1200, shown with a Hard-chine planning hull form. In other embodiments, the vessel 1200 may have a different hull form and the principles described herein may apply equally thereto. FIG. 17 is a cross-section of a portion of the marine vessel hull 1201 taken at line 17-17 in FIG. 16. FIG. 18 is a side cut-away view of marine vessel 1200 and FIG. 19 is an enlarged view of the portion of the cross-section of the hull 1201 indicated by line 19 in FIG. 18. The marine vessel 1200 includes an outer hull 1202 having an outer surface that defines the outer profile of the vessel's hull, and the design of which dictates the hull drag experienced by the vessel. In some embodiments, the marine vessel 1200 may include both an outer hull 1202 and inner hull 1204 which are spaced apart and define a hull cavity 1203 therebetween. The inner surface of the inner hull 1204 defines an interior volume of the vessel, within which other vessel structures (e.g., bulkheads, beams, decks, etc.), shipboard systems, cargo, fuel, etc. may be accommodated on the vessel. In some embodiments, the hull 1201 may not include an inner hull 1204. The hull 1201 has an internal frame that includes transverse and longitudinal braces or frame members. In embodiments that include both an inner and outer hulls 1201, 1202, the inner and outer hulls are joined by some or all of the transverse braces 1206, and longitudinal braces 1207. The longitudinal braces 1207, also referred to as beams, may include one or a pair of keel beams 1209 located at the bilge, and extending form stern to bow. The sidewall (or outboard) portions 1211a,b of the hull 1201 may meet the bottom portions 1213a,b of the hull 1201 at respective left and right chines 1208a,b, with the waterline of the vessel, in certain operating conditions, being above the chine line along the hull's sidewalls. For other hull forms, the bottom portions may transition smoothly, without a hard chine or angle, to the outboard sides of the vessel's hull. As described herein, the hull cavity 1203 may be divided or partially divided into multiple hull cavity portions or bays by the transverse braces 1206 and the longitudinal braces (e.g., beams 1207, and/or keel beams 1209). In some examples, the hull cavity 1203 may be divided by other structures (e.g., plates, boxes). The battery packs 1210 may be sized to fit within the hull cavity 1203. For example, individual battery packs 1210 may be sized to fit between adjacent transverse and longitudinal braces 1206 and 1207, respectively. In some embodiments, some or all of the battery packs may also be sized to fit substantially below the height of the transverse and longitudinal braces 1206, 1207 to as to not extend substantially into the internal volume of the vessel that may otherwise be utilized for other functions. In some embodiments, the internal frame (e.g., transverse and longitudinal braces 1206, 1207) may be substantially enclosed by an inner hull 1204, as shown in FIGS. 16 and 17, and in some such embodiments, the battery packs 1210 may be located below the inner hull (i.e., within the hull cavity 1203 defined between the inner and outer hulls. The battery packs 1210 may be mounted to the inner hull and/or the internal braces by mounting hardware 1212 (e.g., brackets, clamps, or the like). In some embodiments, the battery packs may be integrated into the structure of the inner hull, such as by being laminated or otherwise bonded thereto.

In some embodiments, an opening of suitable size may be provided, e.g., in the inner hull, for access to battery packs located between the inner and outer hulls. In some embodiments, that opening may closed by an access panel or hatch, in some cases sealingly closed so as to prevent or reduce the passage of water through this opening. This may reduce the likelihood of water entering any dry areas/compartments of the vessel and/or may reduce the passage of water into the hull cavity in cases in which the access panel is at a location of the inner hull that may be exposed to the elements. As shown in FIG. 13, a cover plate (e.g., access panel) 1214 may be secured across the access opening providing access to battery pack 1210, e.g., by one or more bolts or other suitable fasteners 1216. The cover plate 1214 may be removably coupled to the inner hull 1204 to provide access to the battery pack 1210 for removal and/or service of the battery pack 1210. In some embodiments, the cover plate 1214 may be configured to provide a preload to the battery pack 1210 to reduce motion and/or protect the battery pack 1210 from below-deck operations. In some embodiments, additional vibration damping materials may be included in a cavity 1218 between the stringers or ribs 1206 around the battery pack 1210. In some embodiments, the cavity 1218 may be a portion of the hull cavity 1203. In some embodiments, the battery pack 1210 may be mounted to the transverse braces 1206 and/or the outer hull 1202 and covered by cover plate 1214. In embodiments where the vessel 1200 includes an inner hull 1204, the battery pack 1210 may be mounted between the outer hull 1202 and inner hull 1204. When the battery pack 1210 is mounted between the outer hull 1202 and inner hull 1204, in some embodiments, the cover plate 1214 may be substantially flush with the inner hull 1204. In some embodiments, the battery pack 1210 may be mounted inside the inner hull 1204 and covered by cover plate 1214.

As described herein, in some example, such as the ones shown in FIGS. 16-19, one or more battery packs 1210 may be located below the displacement waterline of the vessel. Examples for forming and integrating battery packs into the hull according to the present disclose may enable the sealing encasement of battery cells in a manner allowing them to be distributed at location in the hull the may not remain dry at all times. For example, battery packs may be located at the bilge, in ballast compartments, which may optionally and concurrently be used also to contain ballast (e.g., sea water), or another wet area of the watercraft. Is some such embodiments, any electrical connections external to the battery pack (e.g., as used to electrically couple adjacent battery packs) may be electrically insulated (e.g., by appropriate wiring harnesses) if any such connection are to be exposed to a wet environment. In some embodiments, one or more ballast compartments previously provided to house ballast fluid may instead be used solely to contain battery packs.

Marine vessels are typically designed to be stable in order to operate safely on the water. Stability of a marine vessel may be achieved through proper hull design and appropriate weight distribution of the vessel's structure and cargo, sometimes involving the taking on or removal of ballast when the vessel is operated on the water. To improve stability, ballast fluid, typically water, may be taken into the bottom of the ship into compartments to lower the ship's vertical center of gravity. Water used for ship's stability is typically referred to as ballast water. Ballast water is usually contained in several tanks (e.g., ballast compartments) which are distributed throughout the ship's lower hull. Some percentage of the ballast water is added and removed as needed for draft adjustment (i.e., cargo loading and unloading). Ballast compartments are designed to contain the ballast liquid (e.g., ballast water) therein an to remove or add ballast selectively, as desired, such that the dry areas of the vessel, which may be located below decks or above, remain substantially dry. In some embodiments, one or more of the battery packs of a vessel's ESS may be located within one or more ballast compartment(s) or other wet compartments of the vessel. In some specific examples, one or more ballast compartments of a vessel may be located at the bilge of a vessel and, consequently, one or more battery packs may also be located at the bilge.

Figure 20:
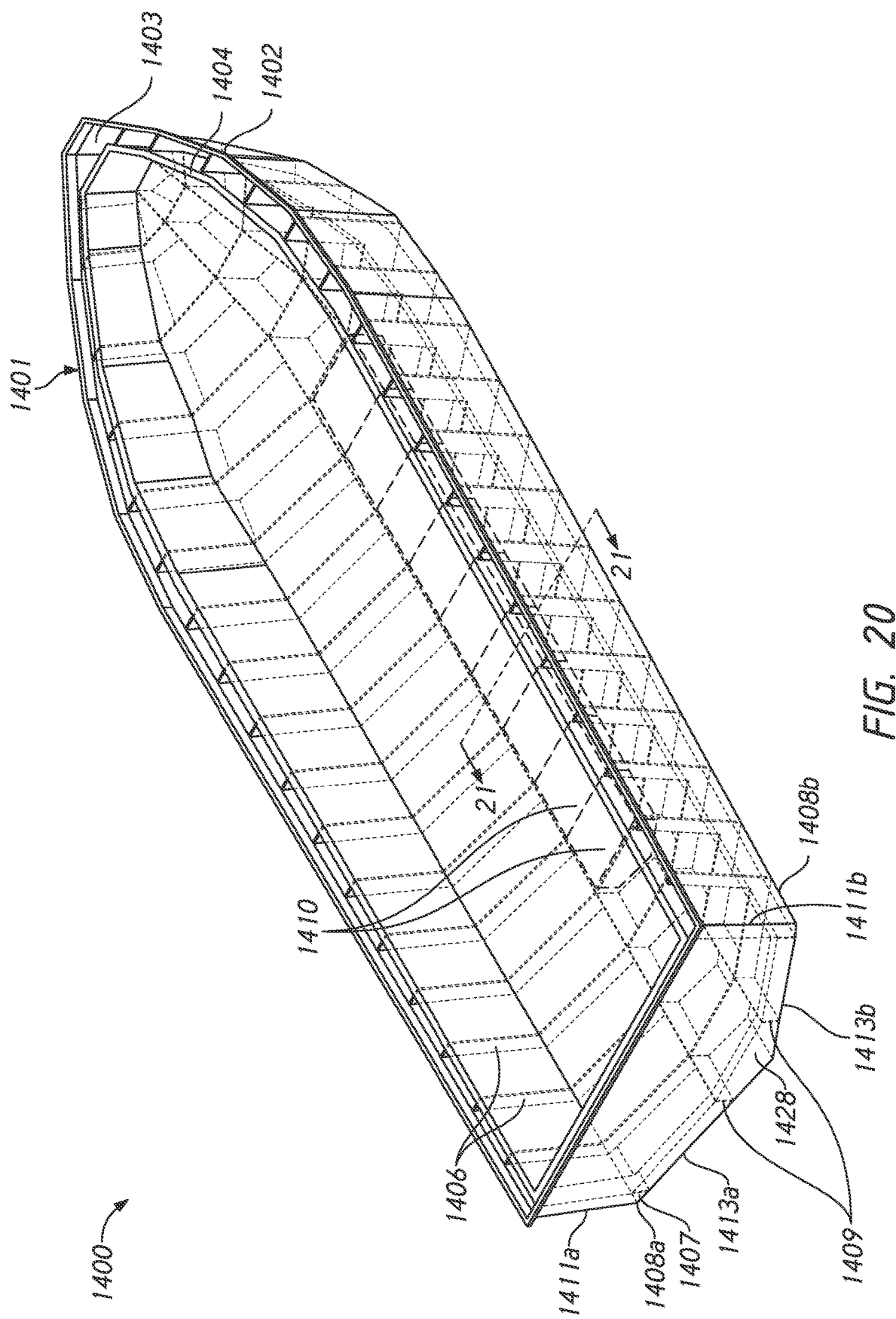
FIG. 20 is a longitudinal cross-sectional illustration of a marine vessel with a hard-chine planning craft hull design according to examples of the disclosure.
Figure 21:
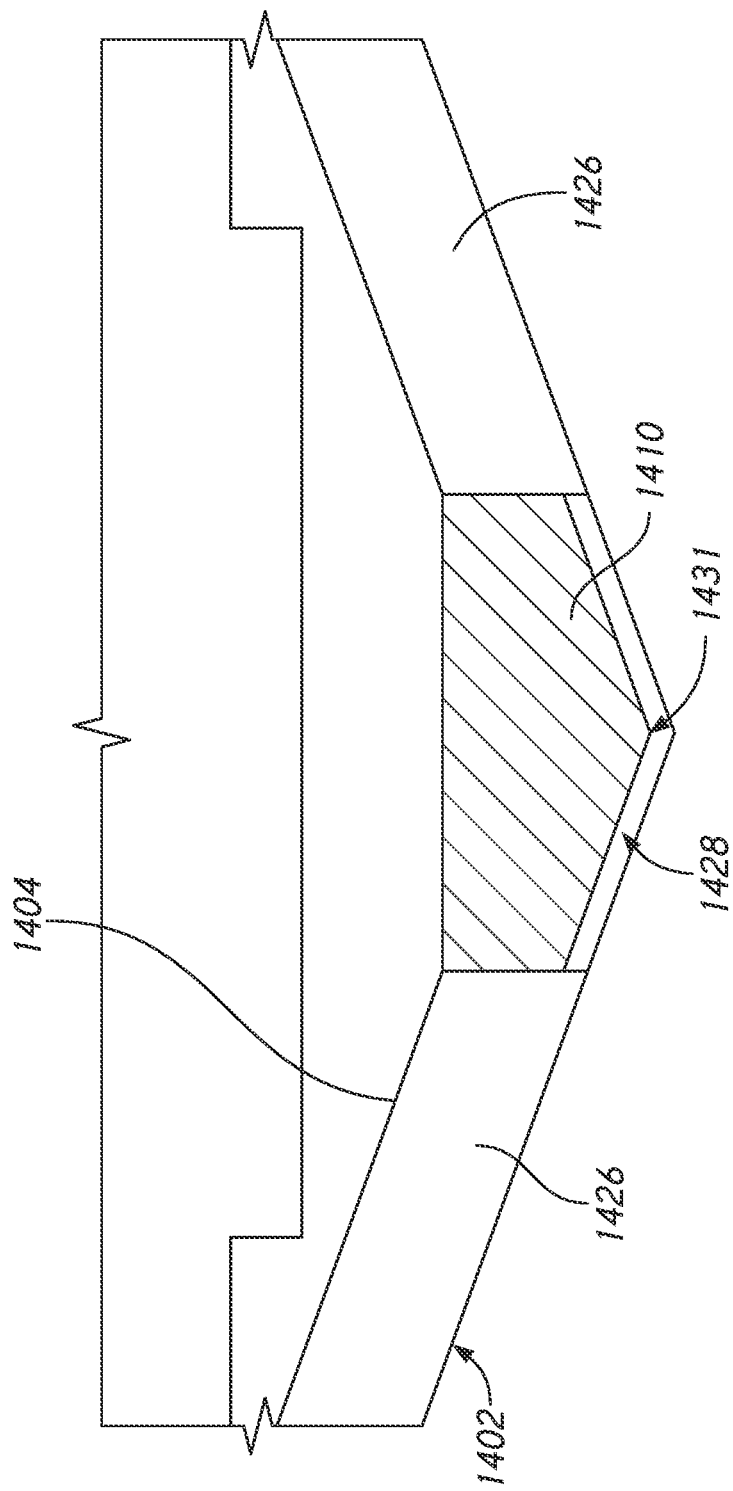
FIG. 21 is a longitudinal cross-sectional illustration of a portion of the marine vessel according to examples of the disclosure.
Figure 22:
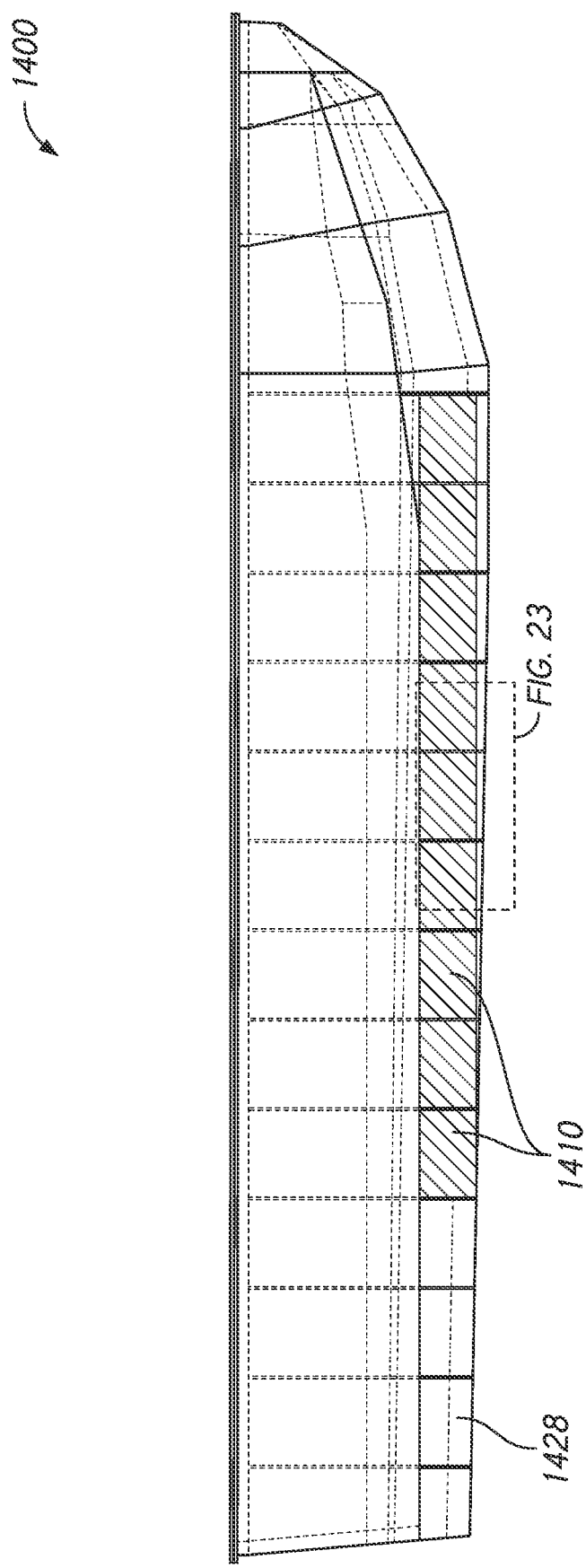
FIG. 22 is a longitudinal cross-sectional illustration of a marine vessel with a hard-chine planning craft hull design according to examples of the disclosure.
Figure 23:
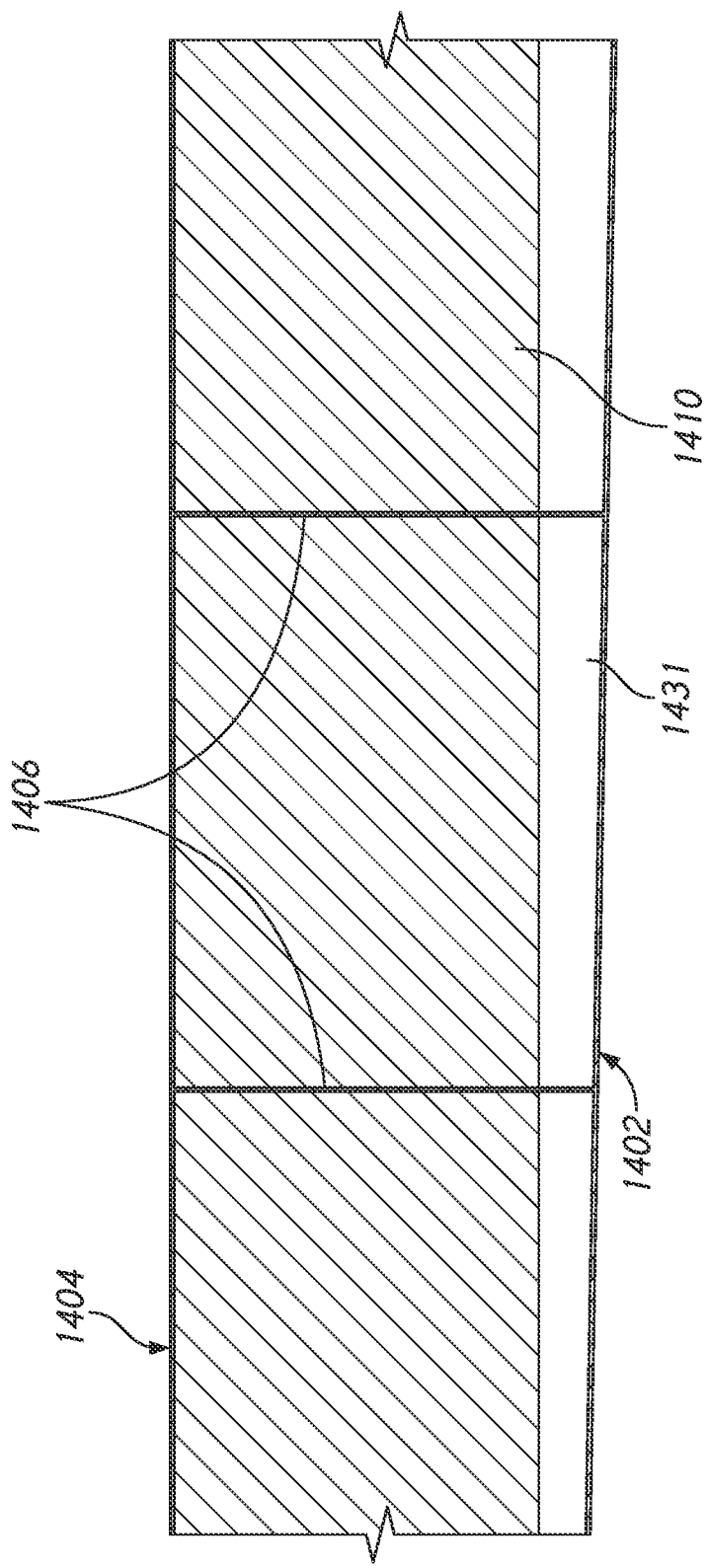
FIG. 23 is a longitudinal cross-sectional illustration of a portion of the marine vessel according to examples of the disclosure.

FIGS. 20-23 illustrate an example arrangement of ESS components (e.g., battery packs) located at the bilge of the vessel. FIG. 20 is an illustration of a marine vessel 1400. The vessel 1400 may have a hard-chine planning craft hull design or another type of hull form. FIG. 21 shows a simplified cross-sectional view of a portion of the marine vessel hull 1401 taken at line 21-21 in FIG. 20. FIG. 22 is a side elevation cutaway view of the marine vessel 1400. FIG. 23 is an enlarged cross-section of a portion of the hull 1401 of the marine vessel 1400 indicated by line 23 in FIG. 22. The marine vessel 1400 includes an outer hull 1402. The outer hull 1402 defines the outer surface of the hull, a portion of which is in contact with water when the vessel 1400 is operated on the water. The shape or contour of the outer hull generally dictates the hull drag experienced by the vessel. In some embodiments, the marine vessel may include both an outer hull 1402 and inner hull 1404, the inner hull having an inner surface that faces the interior of the vessel. The inner surface may define an interior volume or cavity of the vessel, within which other vessel structures (e.g., bulkheads, beams, decks, etc.), shipboard systems, cargo, fuel, etc. may be accommodated on the vessel. In some embodiments, the inner hull 1404 may be omitted. The inner and outer hulls 1404, 1402, respectively, may be spaced apart to define a hull cavity 1403 therebetween. The hull 1401 includes an internal frame comprising a plurality of structural members, referred to as internal braces or frames. Transverse internal braces 1406 extend generally transversely to the hull and longitudinal internal braces (e.g., beams 1407) extend longitudinally, some of which are attached to both the inner and outer hulls joining the inner and outer hulls. For example, as shown in FIG. 20, One or a pair of the longitudinal internal braces may be located at the bilge and referred to as keel beams 1409. The keel beams 1409 may extend substantially the full length (from stem to bow) of the vessel. Other beams may run the full length of the vessel (from stem to bow) or partially along the length of the vessel, such as along a portion of the bottom of the vessel. In the example in FIG. 20, the sidewall portions 1411a,b of the hull meet the bottom portions 1413a,b of the hull at respective left and right chines 1408a,b, to define a hard-chine hull. In other embodiments, the hull may not have a hard chine but may instead transition smoothly from the bottom of the hull to the sidewall portions 1411a,b. In some operating conditions, such as when the vessel is operated in displacement mode, the waterline of the vessel may be above the chine line along the hull's sidewalls. In other operating conditions, such as when the vessel is planning, a larger portion of the hull including the chines or portions thereof, may be elevated above the water.

In some examples, the hull cavity 1403 may be divided or partially divided into multiple portions by the transverse braces 1406 and the longitudinal braces 1407, and 1409. In some examples, the hull cavity 1403 may be divided into portions by other structures (e.g., plates, boxes). In some embodiments, the hull cavity 1403 or a portion thereof may be utilized for holding ballast. For example, the vessel 1400 may include side ballast compartments 1426 and bilge ballast compartment 1428. In some embodiments, the side ballast compartments 1426 may be located between the chine beams 1408a, b, which may be the longitudinal braces closest to the outboard sides of the hull, and the keel beams 1409. One or more bilge ballast compartments 1428 may be located between the left and right keel beams 1409, which may be configured to selectively receive and remove ballast (e.g., water or other ballast fluid or ballast material). The ballast compartments 1426, 1428 may be located between the inner hull 1404 and outer hull 1402 in embodiments having a double hull. In some of these embodiments, the ballast compartments 1426, 1428 may be provided by one or more of the portions of the hull cavity 1403, with individual portions in some cases interconnected by passages such as to enable the movement of ballast between portions of the hull cavity. In some embodiments, the ballast compartments 1426, 1428 may be located, at least partially, interior to the inner hull 1404. In embodiments where inner hull 1404 is omitted, the ballast compartments 1426, 1428 may be located adjacent to the inner surface of the outer hull 1402. In some embodiments, one or more battery packs 1410 may be provided in one or more of the ballast compartments. In some embodiments, support racks (not shown) may be used to position and/or secure the battery packs 1410 in the ballast compartment. Battery packs 1410 may be implemented using any of the examples herein such as battery packs 500 and/or 600.

In the example shown in FIGS. 20-23, battery packs 1410 are arranged in one or more of the vessel's ballast compartments, here in the bilge ballast compartment 1428. In other embodiments, one or more battery packs 1410 may be mounted in one or more other ballast compartment(s) such as the side ballast compartment(s) 1426, instead of or in addition to the bilge ballast compartment 1428. The battery packs 1410 may be configured to substantially fill the ballast compartment, in some cases only a portion thereof such as the portion of the ballast compartment defined between structural members of the hull. The one or more battery packs 1410 may be arranged along the length and/or width of the vessel 1400 to reduce any imbalance of the addition balance the weight of the battery packs 1410. Although battery packs 1410 are placed from stem to bow in the example shown in FIG. 14, in some embodiments, fewer battery packs 1410 may be included such that the battery packs 1410 extend only a partial length of the vessel 1400. In addition or alternatively to being mounted horizontally with respect to one another, the battery packs 1410 may be mounted vertically with respect to one another. In some examples, the battery packs 1410 may be formed to substantially fill a ballast compartment, such as ballast compartment 1428 as shown in FIG. 15. Additional vibration isolation materials could be added at the battery pack 1410 mounting points and/or support racks in some embodiments. Connections to the battery packs 1410 electrical, sensor, outgassing, and coolant connectors may be water-proof connections in some embodiments. In some applications, a layer of keel vibration isolation material 1431 may be included on an outer surface of ballast compartment 1428. Examples of suitable vibration isolation materials include, but are not limited to, rubber, foam, and air or fluid filled vibration absorbers.

As shown in FIG. 23, in some examples, the ribs or stringers 1406 may extend into the ballast compartment 1428 and/or ballast compartments 1426. However, in other examples, the ribs or stringers 1406 may not extend into the ballast compartments 1426, 1428.

The ballast compartment integrated battery packs 1410 co-locates the battery packs 1410 within the volume normally reserved only for the vessel's 1400 water ballast tanks (e.g., ballast compartments 1426, 1428). The mass of the battery packs 1410 may serve to offset the amount of water-based ballast needed. Since the battery packs 1410 may have dual roles as ballast and ESS, this approach may have minimal impact on the vessel's weight and volume. This may be especially advantageous for smaller marine vessels. Since the density of a battery pack 1410 may be greater than the density of sea water in some embodiments, the change to the vessel's 1400 vertical center of gravity envelope may be favorably affected. In some embodiments, the mounting of the battery packs 1410 longitudinally along the ballast may be used to achieve a desired center of gravity envelope for the vessel 1400 and/or planing of the vessel 1400.

As described, in some embodiments, multiple battery packs may be arranged, side by side along the span of an hull cavity portion and/or vertically stacked, along the direction of the height H of the internal braces 1606, as shown in FIG. 25. As shown in FIG. 25, at least one battery pack 1610 may be positioned adjacent to the outer hull 1062, in some case conformally against the outer hull and optionally structurally integrated with the outer hull, within a given hull cavity portion 1603. At least one additional battery pack 1610 may be vertically stacked above the battery pack 1610 against the outer hull 1602. A vibration damper 1615, which may be a structure made from resilient material or some other type compliant structure (e.g., a spring) may be provided between the vertically stacked battery packs. In some embodiments, the battery pack(s) 1610 closer to the inner hull 1604, if present, may be mounted to the inner hull (e.g., integrally formed therewith or otherwise fixed thereto). In some such embodiments, the vertically stacked battery packs may be sufficiently spaced apart so as not to be expected to come into contact and the vibration damper may be omitted. Stacking or otherwise arranging multiple battery packs in a single hull cavity portion 1603 may be used when custom forming/shaping battery packs for differently sized hull cavity portions may be impractical. In such instances, multiple battery packs may be integrated into a single hull cavity portion to nonetheless maximize the use of space provided by the hull cavity. The individual battery packs 1610 may be electrically connected via conductors, in some cases may pass through penetrations in the internal braces 1606. In some cases, one or more of a set of vertically stacked battery packs may be integrated into the structure of the outer hull (e.g., by laminating or otherwise fixing/bonding a battery pack to the outer hull), while one or more other ones of the vertically stacked battery packs may differently secured to the hull, such as by being mounted to the inner surface of an inner hull or suspended by mounting structure between the braces. The term "vertical" when describing the stacking of battery packs refers to stacking in relation to the height dimension of an internal brace. It will be appreciated that when battery packs are integrated into the outboard sides of the hull in which internal braces may extend laterally inward from the outer hull, such vertical stacking refers to the arranging of multiple battery packs laterally inward from the outer hull. In some embodiments, additional structural members may be provided on the side of the inner hull opposite the hull cavity, and in some such cases, battery pack(s) may alternatively or additionally be provided between these additional structural members.

Battery packs of an ESS of a marine propulsion system according to the present disclosure may be integrated into the hull in accordance with any of the examples herein. While specific examples, showing integration of battery packs using different techniques and/or at different locations of the hull are described with reference to FIGS. 8-23 and 25, aspects of these various techniques may be combined. For example, integrating battery packs in the hull by irremovably mounting them to the outer hull, such as described with reference to FIG. 8 may be used to mount battery pack to other locations such as to the outboard sides of the hull or may be used in combination with any of the mounting techniques of other examples. The individual battery packs arranged throughout and integrated into the hull may be coupled to one another in series, parallel, or a combination thereof and coupled to a DC bus. In some embodiments, the battery packs may be coupled to one or more DC/DC controllers, which may couple the batteries to the DC bus.

Disclosed herein are new and unique packaging approaches for battery cells. Using these packaging designs, novel approaches are presented for distributing and integrating battery packs in a marine vessel's hull and/or adjacent to a vessel's hull. The packaging and distribution approaches disclosed herein may make all-electric and hybrid propulsion systems practicable for smaller marine vessels. However, the packaging and distribution approaches disclosed herein are not limited to smaller marine vessels.

Of course, it is to be appreciated that any one of the examples, embodiments or processes described herein may, unless stated otherwise, be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A watercraft comprising:
    a hull providing an internal volume sized to accommodate at least one person therein, wherein the hull comprises an outer hull defining a hull cavity and a plurality of internal braces attached to the outer hull and extending inward therefrom into the hull cavity;

a propulsion system configured to propel the watercraft in electric mode, hybrid-electric mode, or selectively in either electric mode or hybrid-electric mode; and an energy storage system for providing electrical energy to the propulsion system, the energy storage system comprising a plurality of battery packs integrated into the hull such that they are positioned in the hull cavity between the internal braces without using the internal volume of the vessel, wherein each battery pack of the plurality comprises one or more battery cells, a sealed housing enclosing the one or more battery cells, and at least one compliant layer between the housing and the one or more battery cells, wherein the compliant layer is configured to reduce transmission of vibrations from the hull to the one or more battery cells.

2. The watercraft of claim 1, wherein each of the one or more battery cells comprises a first surface and a second surface opposite the first surface, wherein the at least one compliant layer is positioned against the first surface of a first battery cell, and the sealed housing includes a positive lug flange electrically coupled to a positive terminal of the one or more battery cells and a negative lug flange electrically coupled to a negative terminal of the one or more battery cells.

3. The watercraft of claim 2, wherein the at least one compliant layer comprises a first compliant layer substantially co-extensive with the first surface of the first battery cell.

4. The watercraft of claim 1, wherein each of the battery packs of the plurality comprises a plurality of the battery cells, and wherein the at least one compliant layer comprises a first compliant layer separating one or more of the plurality of battery cells from any adjacent battery cells.

5. The watercraft of claim 4, wherein positive terminals of each of the plurality of battery cells of an individual battery pack are electrically coupled to one another and negative terminals of each of the plurality of battery cells of the individual battery pack are electrically coupled to one another internal to the housing of the individual battery pack.

6. The watercraft of claim 1, wherein the one or more battery cells are enclosed in a vacuum bag and wherein the at least one compliant layer comprises a first compliant layer between the vacuum bag and the sealed housing.

7. The watercraft of claim 1, further comprising a dielectric fluid within the housing of each battery pack of the plurality, wherein the dielectric fluid is in direct contact with the one or more battery cells of an individual battery pack.

8. The watercraft of claim 4, wherein the dielectric fluid is fluidly coupled to a cooling loop external to the housing of the individual battery pack, the cooling loop configured to circulate the dielectric fluid into and out of the housing of the individual battery pack.

9. The watercraft of claim 8, wherein the dielectric fluid within each of the battery packs of the plurality are fluid coupled to a single external cooling loop.

10. The watercraft of claim 8, wherein the external cooling loop includes a heat-exchanger configured to transfer heat from the dielectric fluid to a second working fluid.

11. The watercraft of claim 1, wherein at least one of the plurality of battery packs is integrated with the outer hull.

12. The watercraft of claim 1, wherein at least one of the plurality of battery packs is positioned between the outer hull and the inner hull.

13. The watercraft of claim 1, wherein at least one of the plurality of battery packs is located in a ballast compartment or another wet area of the watercraft.

14. The watercraft of claim 1, wherein the propulsion system is a hybrid propulsion system, the watercraft further comprising a fuel tank for storing and providing fuel to the propulsion system.

15. The watercraft of claim 1, wherein at least one of the plurality of battery packs is integrated into the hull at a location which is below a waterline of the vessel when the vessel is operated in displacement mode.

16. The watercraft of claim 15, wherein the at least one of the plurality of battery packs is located at the bilge of the vessel.

17. The watercraft of claim 1, wherein the plurality of internal braces comprises a first internal brace attached to and extending from an inner surface of the outer hull, the first internal brace having a height above the inner surface of the outer hull.

18. The watercraft of claim 17, wherein at least one of the plurality of battery packs is contained below the height of the first internal brace.

19. The watercraft of claim 17, wherein a first battery pack of the plurality is integrated into the hull on one side of the first internal brace and a second battery pack of the plurality is integrated into the hull on an opposite side of the first internal brace.

20. The watercraft of claim 17, wherein a first battery pack is electrically connected to the second battery pack via an electrical conductor that passes through the first internal brace.

21. The watercraft of claim 1, wherein the at least one of the plurality of battery packs substantially fills a space defined between adjacent ones of the plurality of internal braces.

22. The watercraft of claim 21, wherein the hull further comprises an inner hull extending over and enclosing the space defined between the plurality of internal braces.

23. The watercraft of claim 1, wherein the hull comprises an outer hull and an inner hull spaced from the outer hull to define a hull cavity, which is segmented into hull cavity portions by longitudinal and transverse structural members, and wherein a first battery pack is located in a first hull cavity portion and a second battery pack is located in a second hull cavity portion.

24. The watercraft of claim 23, wherein at least one of the plurality of battery packs conforms to a contour of the outer hull or of the inner hull.

25. The watercraft of claim 23, wherein at least one of the plurality of battery packs is spaced from the inner and outer hulls by respective mounts configured to reduce transmission of vibrations from the hull to the battery pack.

26. The watercraft of claim 23, wherein at least one of the plurality of battery packs is fixed such that it lies against the outer hull or the inner hull.

27. The watercraft of claim 26, wherein the least one of the plurality of battery packs is fixed to an inner surface of the outer hull.

28. The watercraft of claim 23, wherein at least one of the plurality of battery packs is removably coupled to the hull cavity.

* * * * *